US008139257B2

(12) United States Patent
Fabrice

(10) Patent No.: US 8,139,257 B2
(45) Date of Patent: Mar. 20, 2012

(54) DOCUMENT EDITING APPARATUS, IMAGE FORMING APPARATUS, DOCUMENT EDITING METHOD, AND COMPUTER PROGRAM PRODUCT

(75) Inventor: Matulic Fabrice, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1224 days.

(21) Appl. No.: 11/606,706

(22) Filed: Nov. 29, 2006

(65) Prior Publication Data

US 2007/0133074 A1 Jun. 14, 2007

(30) Foreign Application Priority Data

Nov. 29, 2005 (JP) .................................. 2005-344117

(51) Int. Cl.
*G06K 15/00* (2006.01)
*G06K 1/00* (2006.01)
*H04N 1/387* (2006.01)
*H04N 1/46* (2006.01)
*G09G 5/00* (2006.01)
*G06F 3/048* (2006.01)

(52) U.S. Cl. ........ 358/1.18; 358/1.9; 358/452; 358/453; 358/462; 358/537; 345/1.1; 345/1.3; 345/2.2; 715/778

(58) Field of Classification Search ................. 358/1.16, 358/1.18, 1.9, 2.1, 452, 453, 462, 464, 505, 358/537, 540; 345/1.1, 1.3, 2.2, 33, 619

See application file for complete search history.

(56) References Cited

U.S. PATENT DOCUMENTS

| 5,511,148 | A | 4/1996 | Wellner |
| 2001/0019424 | A1* | 9/2001 | Idehara ........................ 358/1.15 |
| 2004/0247206 | A1* | 12/2004 | Kaneda et al. ................ 382/305 |

FOREIGN PATENT DOCUMENTS

| JP | 05-068161 | 3/1993 |
| JP | 05-108866 | 4/1993 |
| JP | HEI 09-034893 | 2/1997 |
| JP | 09-091450 A | 4/1997 |
| JP | 09-305596 | 11/1997 |
| JP | 2002-112022 | 4/2002 |
| JP | 2004-220424 | 8/2004 |
| JP | 2004-240672 | 8/2004 |
| JP | 2005-135041 | 5/2005 |
| WO | WO 02/23386 | 3/2002 |

OTHER PUBLICATIONS

Japanese Office Action for corresponding Japanese Patent Application No. 2005-344117, Mar. 29, 2011, 3 pgs. *No Translation Provided*.
Japanese Office Action for corresponding Japanese Patent Application No. 2005-344117, 1 Jun. 2010, 2 Pgs. *No Translation Provided*.

* cited by examiner

*Primary Examiner* — Thomas Lett
(74) *Attorney, Agent, or Firm* — Blakely, Sokoloff, Taylor & Zafman LLP

(57) ABSTRACT

An area identifying unit separates input image data into each image area. An editing unit performs an editing process on the input image data in units of separated image area. An operation displaying unit displays the input image data with an input display module and an editing display module. The operation displaying unit is capable of accepting editing inputs and an input of various settings through a touch input on the display. The editing unit performs the editing process on the image data based on the editing input. The operation displaying unit further displays an editing result performed by the editing unit.

19 Claims, 21 Drawing Sheets

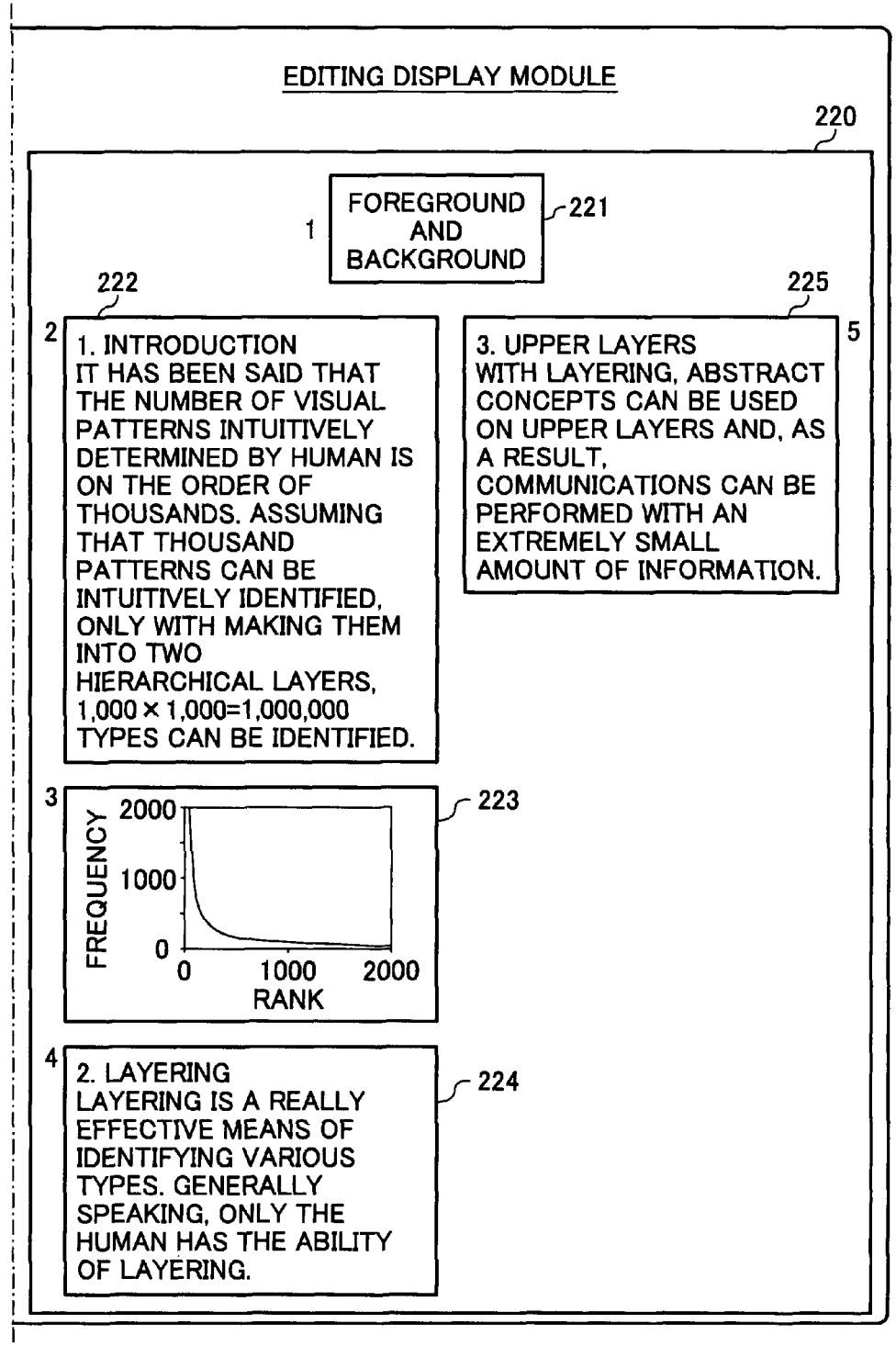

DOCUMENT EDITING APPARATUS, IMAGE FORMING APPARATUS, DOCUMENT EDITING METHOD, AND COMPUTER PROGRAM PRODUCT

PRIORITY

The present document claims priority to and incorporates by reference the entire contents of Japanese priority document, 2005-344117 filed in Japan on Nov. 29, 2005.

BACKGROUND OF THE INVENTION

1. Field of the Invention

The present invention relates to a technology for editing a document on an electronic device including an operation displaying unit.

2. Description of the Related Art

Conventionally, in image forming apparatuses, such as Digital Multifunction Products (MFPs), a touch panel where an operation is input and where the state of a document output and others are displayed is extremely small, and therefore items that can be subjected to an editing operation are limited.

Also, when an editing operation is performed on such a touch panel of an image forming apparatus, it is difficult to check and set the arrangement order of the contents and others in a printing state while viewing each image component on the touch panel because the size of the touch panel is limited.

To solve these problems, there is a technology devised in which an image is read by a scanner and an area selection screen is displayed on a touch panel; the image is area-divided into a character area, a photographic area, a graphic area, and a background area; a user's selection of any divided image area is accepted; when a desired area selection key is pressed, a screen is displayed to specify how to adjust density and color balance for each selected image area; and then the density and color balance are adjusted according to the specified adjustment for image formation (Japanese Patent Application Laid-Open Publication No. 2002-112002).

In the technology disclosed in this gazette mentioned above, a screen for setting an adjustment on an image area is displayed and a selection menu is displayed. Therefore, the technology is very convenient for displaying a setting menu for a setting operation.

However, although the technology disclosed in this gazette mentioned above is very convenient in setting on a screen of a touch panel, how an actual completed image will be output after setting is not displayed, thereby posing a problem that the arrangement and state of the completed print is unknown before printing. In particular, when each image component is subjected to an edit setting, such as enlargement, reduction, deletion, or rearrangement, how the image will be changed after reflecting the edit setting result is left unknown. Therefore, there is a possibility that printing a desired output result will not be possible.

SUMMARY OF THE INVENTION

A document editing apparatus, image forming apparatus, document editing method and computer program product are described. In one embodiment, an image editing apparatus comprises an input unit that inputs image data; an area identifying unit that separates input image data into each image area; an editing unit that performs an editing process on the input image data in separated image area units; and an operation displaying unit that displays the input image data with an input display module in which the input image data is displayed in the separated image area units without performing the editing process and an editing display module in which the input image data is displayed in the separated image area units and which performs the editing process on a display, the operation displaying unit being capable of accepting edits and an input of various settings through a touch input on the display, wherein the editing unit performs the editing process on the image data based on editing input from at least one of the input display module and the editing display module, and the operation displaying unit further displays an editing result performed by the editing unit.

DETAILED DESCRIPTION OF THE PREFERRED EMBODIMENTS

Figure 1:
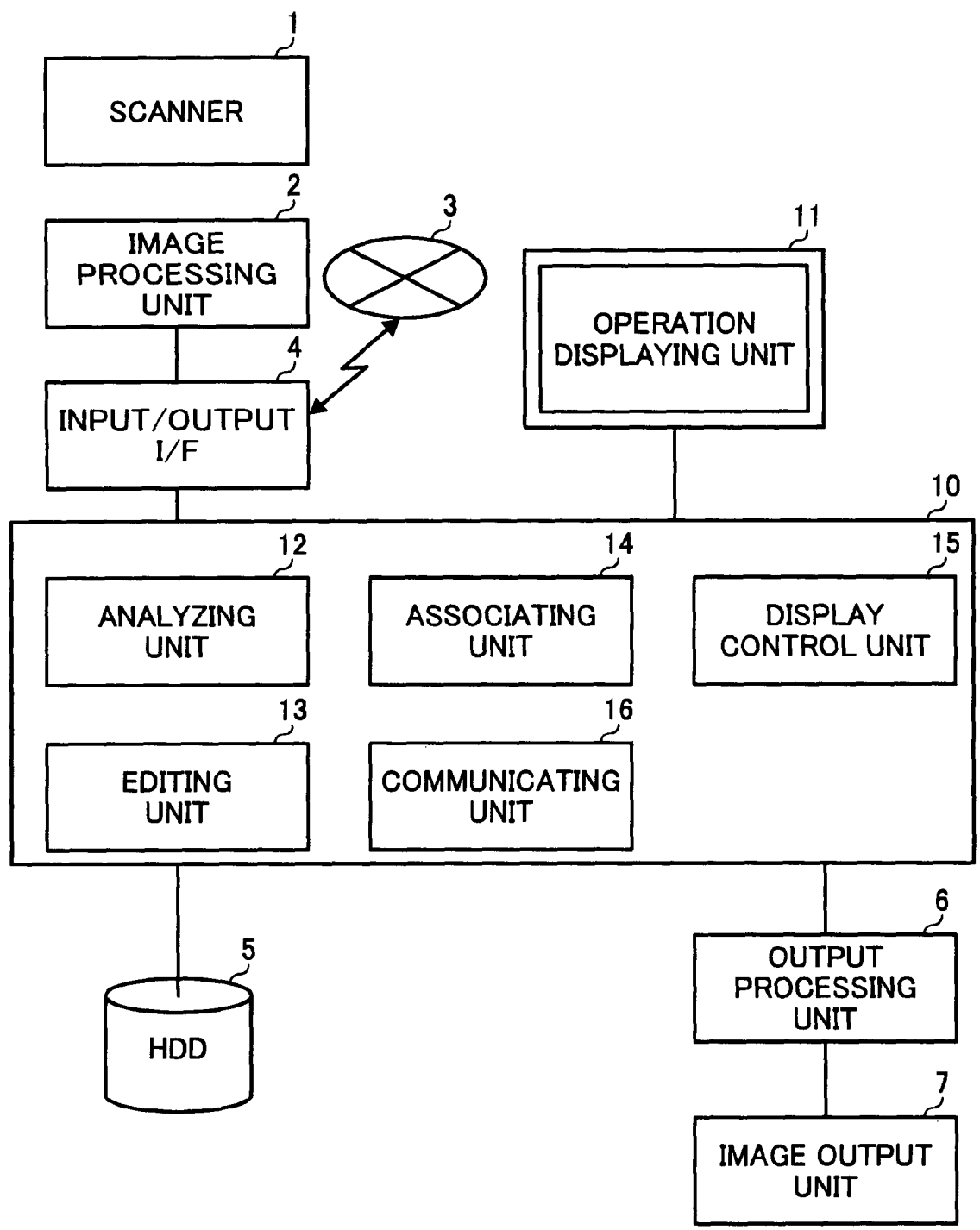
FIG. 1 is a functional block diagram of a document editing apparatus according to a first embodiment of the present invention, applied to an image forming apparatus.

An image editing apparatus according to one embodiment of the present invention includes an input unit that inputs image data; an area identifying unit that separates input image data into each image area; an editing unit that performs an editing process on the input image data in separated image area units; and an operation displaying unit that displays the input image data with an input display module in which the input image data is displayed in the separated image area units without performing the editing process and an editing display module in which the input image data is displayed in the separated image area units and which performs the editing process on a display, which is capable of accepting an editing and an input of various settings through a touch input on the display. The editing unit performs the editing process on the image data based on an editing input from at least one of the input display module and the editing display module. The operation displaying unit further displays an editing result performed by the editing unit.

An image editing method according to another embodiment of the present invention includes inputting image data; separating input image data into each image area; editing the input image data in units of separated image area; and operating displaying including displaying the input image data with an input display module in which the input image data is displayed in the separated image area units without performing the editing process and an editing display module in which the input image data is displayed in the separated image area units and which performs the editing process on a display, and accepting an editing and an input of various settings through a touch input on the display. The editing includes editing the image data based on an editing input from at least one of the input display module and the editing display module. The operation displaying further includes displaying an editing result performed at the editing.

A computer program product according to still another embodiment of the present invention includes a computer usable medium having computer readable program codes embodied in the medium that when executed cause a computer to execute inputting image data; separating input image data into each image area; editing the input image data in separated image area units; and operating displaying including displaying the input image data with an input display module in which the input image data is displayed in the separated image area units without performing the editing process and an editing display module in which the input image data is displayed in the separated image area units and which performs the editing process on a display, and accepting an editing and an input of various settings through a touch input on the display. The editing includes editing the image data based on an editing input from at least one of the input display module and the editing display module. The operation displaying further includes displaying an editing result performed at the editing.

The above and other embodiments, features, advantages and technical and industrial significance of this invention will be better understood by reading the following detailed description of presently preferred embodiments of the invention, when considered in connection with the accompanying drawings.

Exemplary embodiments According to one embodiment of the present invention will be explained in detail below with reference to the accompanying drawings.

FIG. 1 is a functional block diagram of a document editing apparatus according to a first embodiment of the present invention, applied to an image forming apparatus. The image forming apparatus connected to a network 3 includes a scanner 1, an image processing unit 2, an input/output interface (I/F) 4, a document editing apparatus 10, a storage device (hard disk drive (HDD)) 5, an output processing unit 6, and an image output unit 7. The document editing apparatus 10 includes an operation displaying unit 11, an analyzing unit 12, an editing unit 13, an associating unit 14, a display control unit 15, and a communicating unit 16.

The document editing apparatus 10 according to the first embodiment receives electronic mails and various electronic data as inputs through the scanner 1 and the network 3 via a single application incorporated in the document editing apparatus 10, and displays an image on the operation displaying unit 11. With the displayed image being taken as an interface (I/F), an operator inputs an editing instruction through, for example, a touch input from the operation displaying unit 11. The editing unit 13 performs editing based on an input editing item. Then, electronic data after editing is displayed again on the operation displaying unit 11.

In the document editing apparatus 10 according to the first embodiment, the operation displaying unit 11 produces a display with two display modules, that is, an input display module representing an input state and an editing display module representing a post-editing state. From the display with these two modules, an input is accepted, and editing is further performed, and then the editing result is displayed. Therefore, various edit setting can be attempted on the operation displaying unit 11 for viewing before an output, such as printing. In this manner, it is possible to edit document information on a single application through a simple input scheme including a touch input and then check the post-editing state before output. Therefore, a document editing apparatus that is convenient for document editing operation and efficient in editing can be achieved.

In the document editing apparatus 10, the scanner 1 reads a document. The image processing unit 2 converts analog data of the document read by the scanner to electronic digital data.

The input/output I/F 4 receives an input of the image data obtained through digital conversion by the image processing unit 2. Also, the input/output I/F 4 receives an input of an electronic mail received through the network 3 and electronic data stored in various recording medium (not shown).

The communicating unit 16 transmits various electronic data edited by the document editing apparatus 10 as an electronic mail through the input/output I/F 4. Also, through the input/output I/F 4, various electronic data edited by the document editing apparatus 10 is output in a format that allows them to be written in a recording medium.

The operation displaying unit 11 accepts various settings inputs including an edit setting and a print setting provided by the operator from the displayed image and screen. The operation displaying unit 11 receives an input upon a touch of a finger tip of a person, a stylus pen or other touch input instruments. The operation displaying unit 11 detects and accepts an input at each position on a display surface through a known technology, such as a resist-film scheme in which a change in resistance due to the pressure from a tip of a finger or pen is detected or an analog capacitance coupling scheme. In the following, a touch input is used for purposes of an example, where an input is provided by touching the operation displaying unit 11. However, the present invention is not necessarily restricted to a touch input, and various input schemes including those using a mouse, a keyboard, or press switches can be used.

Figure 2A:
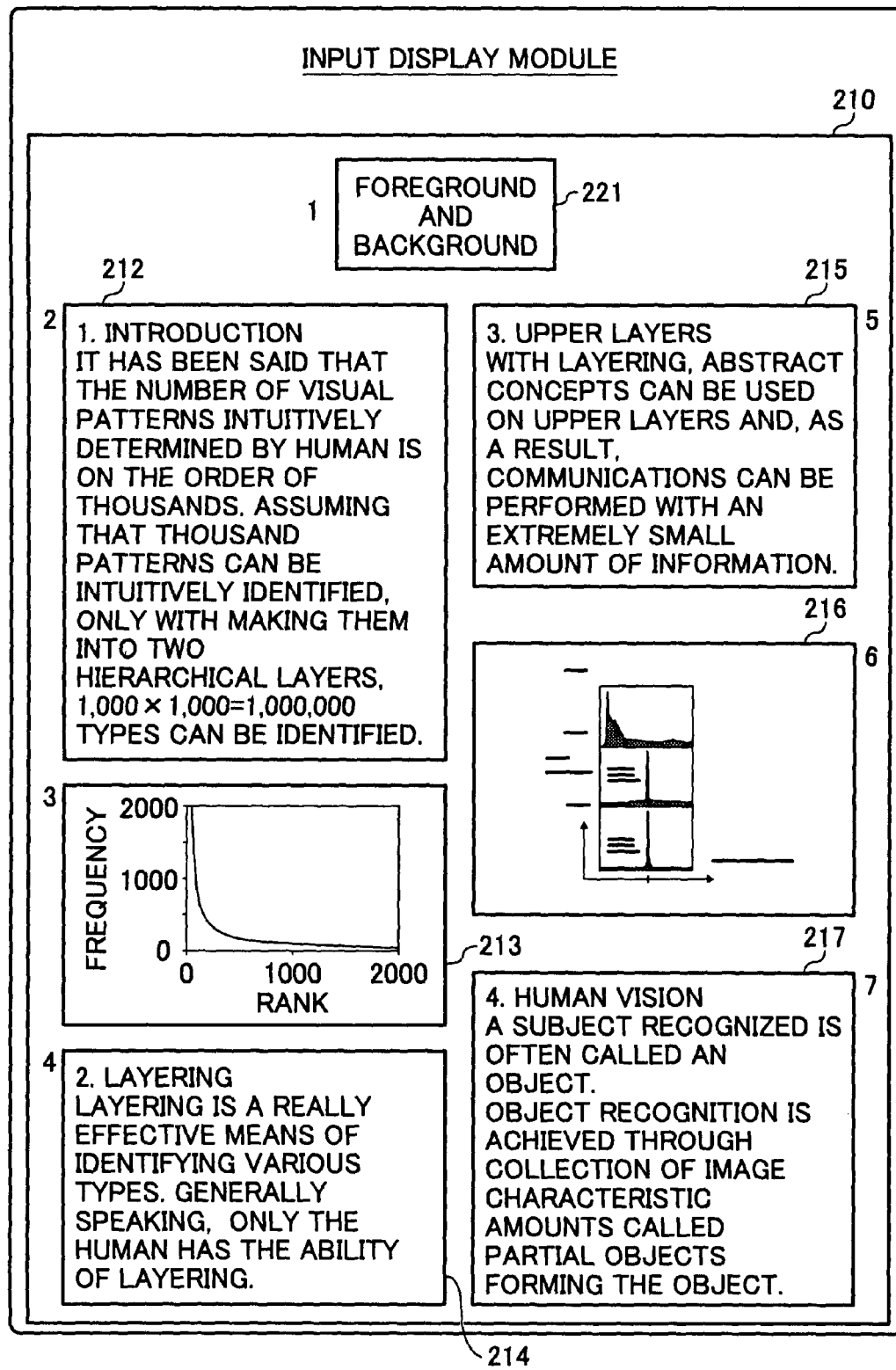
FIG. 2 is a schematic drawing of one example of two display modules displayed by an operation displaying unit.

FIG. 2 is a schematic drawing of one example of two display modules displayed by the operation displaying unit 11. The operation displaying unit 11 receives an edit setting through a touch input from the operator through the displayed image as an interface. The editing unit 13 performs editing based on the accepted editing items, and then causes electronic data to be displayed again on the operation displaying unit 11 after editing.

The operation displaying unit 11 produces a display with two display modules, that is, an input display module 210 in which the input document data is displayed in units of document components without being subjected to an editing process and an editing display module 220 in which the input document data is displayed in units of document components as being subjected to an editing process by the editing unit 13. On a screen in the input display module 210, document components 211 to 217 are displayed as being read by the scanner 1 as it is.

On the other hand, on a screen in the editing display module 220, document components 221 to 225 are displayed with the document components 216 and 217 being deleted through an editing process. These two display modules displayed by the operation displaying unit 11 functions as an interface that receives a touch input, and receives an editing input. The editing process result is displayed again in the editing display module.

For document components obtained through division by the analyzing unit 12, the associating unit 14 associates document components on a display in the input display module 210 with document components in an editing display module 220 subjected to an editing process.

Figure 3:
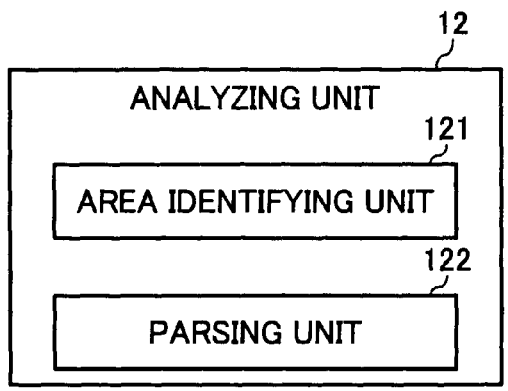
FIG. 3 is a functional block diagram of an analyzing unit.

FIG. 3 is a block diagram of the analyzing unit 12. The analyzing unit 12 includes an area identifying unit 121 and a parsing unit 122. The analyzing unit 12 analyzes input document data to determine which one of attributes, which include a character, a photographic image, a halftone image, a chart image, and another image, the document data representing a document component has. The area identifying unit 121 identifies each area of document data.

Figure 4:
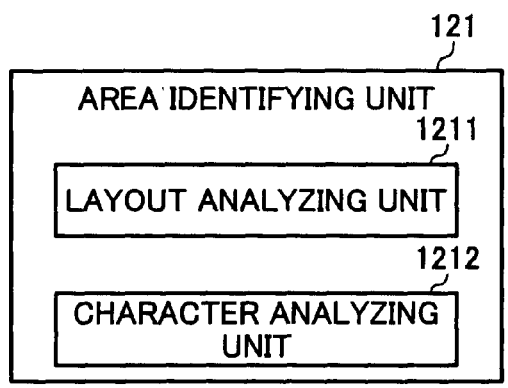
FIG. 4 is a functional block diagram of an area identifying unit.

FIG. 4 is a functional block diagram of the area identifying unit 121. The area identifying unit 121 identifies an area of document data through a known technology, such as detection of a light and dark change, detection of an edge portion, and detection of a halftone area. Based on the detection by the area identifying unit 121, it can be detected that the halftone area represents a photographic image, that the area represents a character or graphic chart image, and others by the detection of the edge portion.

The area identifying unit 121 includes a layout analyzing unit 1211 and a character analyzing unit 1212. The layout analyzing unit 1211 analyzes the layout structure of the document component in the document. In layout analysis performed by the layout analyzing unit 1211, detection information, for example, information about edge detection, halftone detection, or pixel position detection, is analyzed by being applied to a known algorithm.

Figure 5:
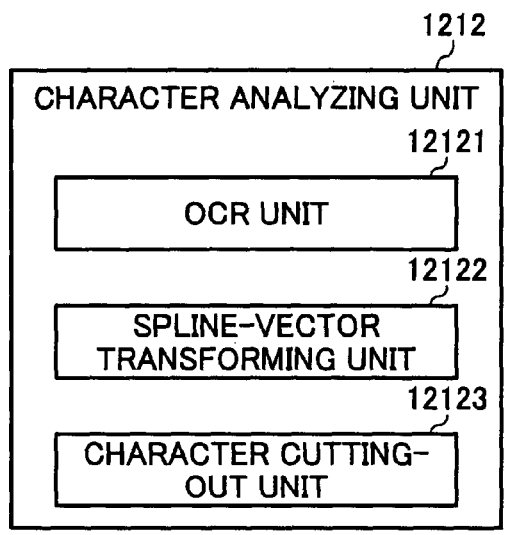
FIG. 5 is a functional block diagram of a character analyzing unit.

FIG. 5 is a functional block diagram of a character analyzing unit. The character analyzing unit 1212 includes an optical character recognition (OCR) unit 12121, a spline-vector transforming unit 12122, a character cutting-out unit 12123.

The character analyzing unit 1212 converts a character element to a machine-processable format. The character cutting-out unit 12123 cuts out a character through light and dark detection. The spline-vector transforming unit 12122 performs a spline shaping process on the cut-out character. The OCR unit 12121 optically reads the character read as an image for character recognition. Character analysis is possible by applying a known algorithm to the character.

Since the character analyzing unit 1212 converts a character element to a machine-processable format, an editing process to be performed by the editing unit 13 can be made accurate and fast. Also, since the OCR unit 12121 can extract a character image as text information, efficient and convenient display and editing processes can be achieved. Also, with the spline-vector transforming unit 12122, a character can be displayed more smoothly. Furthermore, with provision of the character cutting-out unit 12123, a character can be accurately cut out for character analysis.

In this manner, the area identifying unit 121 analyzes the attribute of each document component based on the analyses by the layout analyzing unit 1211 and the character analyzing unit 1212. With this, division of document components and attribute analysis of the document components by analyzing unit can be performed with higher accuracy.

The area identifying unit 121 identifies, for example, an area as a character area by detecting that portions determined to be characters are successive. Also, an area can be identified as a photographic image area by detecting that halftone pixels are successive. Still further, an area can be identified as a chart-image are by detecting that a difference in light and dark is significant. Otherwise, an area is determined as being neither a character image, a photographic image, nor a chart image, and then an area identifying process is performed on that area. These are known technologies, and therefore are not explained in detail herein.

The parsing unit 122 performing parsing through an algorithm of the known technology based on information about a position relation for each identified area, an order, and detection of whether the area represents a character or a halftone area.

The analyzing unit 12 analyzes each document component to determine which one of attributes of image types, which includes a character, a halftone image, a chart, an image, and other data, the document component has, based on identification of the area by the area identifying unit 121 and analyzing of parsing by the parsing unit 122. That is, the analyzing unit 12 analyzes the input image data to determine which one of attributes, which includes a character image, a photographic image, a chart image, and another image each document component has, and then divides the input image data into areas. With the analyzing unit 12 including the area identifying unit 121 and the parsing unit 122 and analyzing the attribute of each document based on each of the analysis results from these two units, the accuracy of attribute analysis of the document components is further increased.

The analyzing unit 12 divides the image data into areas, for example, by paragraph for a character attribute, and by photo image and chart image for a photographic image attribute and a chart image attribute.

The analyzing unit 12 determines the attribute based on the setting input accepted by the operation displaying unit 11 from the operator for that attribute. For example, when the operator determines by himself or herself from the displayed screen that the character image displayed after analysis by the analyzing unit 12 is actually a photographic image and provides a setting input indicating that the image is a photographic image, the determination of the attribute as a photographic image is accepted.

The operation displaying unit 11 divides the image data into document components according to the attributes obtained through analysis by the analyzing unit 12, then as shown in FIG. 2, produces a display with two display modules, and then accepts a setting input from the operator through these two display modules. With this, the operator can provide editing inputs through both of the input display module 210 and the editing display module 220 representing a post-editing display displayed on the operation displaying unit 11.

The editing unit 13 performs an editing process on the document data according to an editing input accepted by the operation displaying unit 11 for each document component whose attribute has been analyzed by the analyzing unit 12, and then transmits the result to the display control unit 15. The display control unit 15 caused the image data subjected to the editing process by the editing unit 13 to be displayed.

Also, the editing unit 13 transmits the image data subjected to the editing process to the output processing unit 6. The output processing unit 6 processes the data after the editing process transmitted from the editing unit to obtain image data for print output, and then transmits the image data for print output to the image output unit 7. The image output unit 7 produces a printing output based on the image data after the output process by the output processing unit 6.

Furthermore, the editing unit 13 transmits the image data subjected to the editing process to the communicating unit 16, thereby allowing the image data to be transmitted as an electronic mail to an address on the network through the input/output I/F 4.

For the image data first read by the scanner 1, an editing process has not been accepted yet. Therefore, the editing unit 13 outputs the unedited image data as it is to the display control unit 15. The display control unit 15 causes the image data output from the editing unit 13 to be displayed as an input display module on the operation displaying unit 11.

In the image before editing, a setting through an operation from the operation displaying unit 11 for deleting two document components 216 and 217 depicted in FIG. 2 is possible through a pull-down menu scheme developed on the operation displaying unit 11, or a touch input.

The editing unit 13 accepts from the operation displaying unit 11 a setting for deleting the document components 216 and 217, and newly generates image data after editing with these two document components 216 and 217, which are areas associated by the associating unit 14, being deleted from the input data image.

The display control unit 15 generates information about an area defining representation, which is a representation that defines an area occupied by each document component analyzed by the analyzing unit 12. The display control unit 15 causes area defining representations to be displayed on the operation displaying unit 11 with boundaries between document components being defined. By the operation displaying unit 11 displaying the area defining representations, the position and size of the document component becomes apparent.

Figure 6:
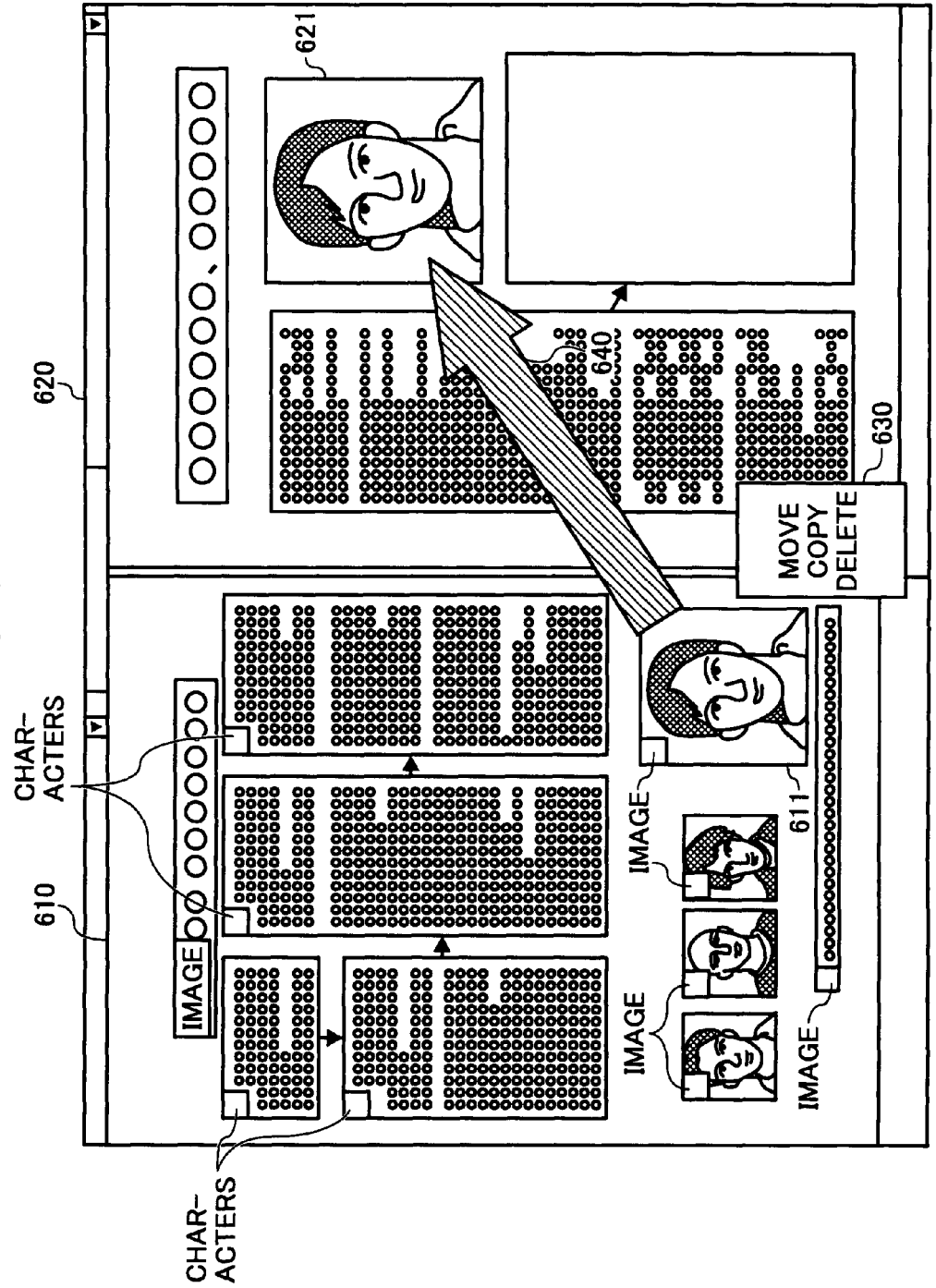
FIG. 6 is a drawing illustrating area defining representations displayed on the operation displaying unit.

FIG. 6 is a drawing illustrating area defining representations displayed on the operation displaying unit 11. In an example depicted in FIG. 6, paragraphs composed of characters and images are each displayed as a rectangle defined by a bold solid line.

Also, the display control unit 15 preferably generates information about an area defining representation so that the area defining representation is displayed to define the area of the document component and to be layered on the area of the document component. For example, the operation displaying unit 11 displays information about the area defining representation in a form in which it looks as if a pink translucent layer defining the rectangle of the document component is layered on the rectangle of the document component. In this manner, by performing a layering process with a transparent or translucent-colored layer, the position and size of the document component becomes apparent.

Furthermore, the display control unit 15 generates an area defining representation as display information in different colors according to different attributes of the document components. For example, the display control unit 15 generates display information in blue for an area defining representation of a character image, in green for an area defining representation of a photographic image, in pink for an area defining representation of a chart image, and in yellow for those of other images. In this manner, different attributes, such as a character and a chart, are displayed in different colors on the operation displaying unit 11. With such a display by the operation displaying unit 11, the type, position, and size of each document component becomes apparent.

The operation displaying unit 11 accepts an input signal requesting for at least any one of the editing operations of add, move, and delete, for each of the document components displayed. This can be done through a touch input on the screen of the operation displaying unit 11.

For example, when the operator touches an image 611 shown in FIG. 6 and then drags the same image to a position where an image 621 is located in an editing display module 620 on the right, a pull-down menu 630 and an arrow 640 representing a distance traveled are displayed. Furthermore, for example, when "copy" in the pull-down menu 630 is selected through a touch input, the editing unit 13 performs a "copy" process accepted from the pull-down menu 630 of the operation displaying unit 11.

The display control unit 15 receives copy data edited by the editing unit 13, and causes the image 621, which is a document component subjected to the copy process, to be displayed on the operation displaying unit 11. In this manner, the document component displayed can be edited and then displayed in a post-editing form (image 621).

In addition, the operation displaying unit 11 can accept a drag operation by, in addition to a touch input by a finger, a stylus pen or the like on each of the document components displayed. This allows a finer operation. Furthermore, in addition to a drag operation, an operation can be possible such that a setting input by a touch input from the predetermined menu displayed on the operation displaying unit 11 causes a document component to be inserted and displayed in the editing display module.

Furthermore, the operation displaying unit 11 accepts an input requesting for an insertion of a document component in an arbitrary place in the editing display module 620, the input being produced by selection from, for example, the pull-down menu 630 shown in FIG. 6, via the document component displayed on the operation displaying unit 11. Based on the request input accepted by the operation displaying unit 1, the editing unit performs an editing process, the display control unit 15 generates display information, and the operation displaying unit 11 produces a display according to the generated display information, as already explained above.

The document editing apparatus 10 transmits the post-editing document data as being edited for the editing display module 220 displayed on the operation displaying unit 11 to the output process unit 6, and then produces an image output via the image output unit 7. Alternatively, the post-editing document data may be transmitted as an electronic mail via the communicating unit 16 and the input/output I/F 4. Still alternatively, the post-editing document data may be output to various recording medium via the input/output I/F 4. The document data edited by the document editing apparatus 10 can be output in various output forms.

Figure 7:
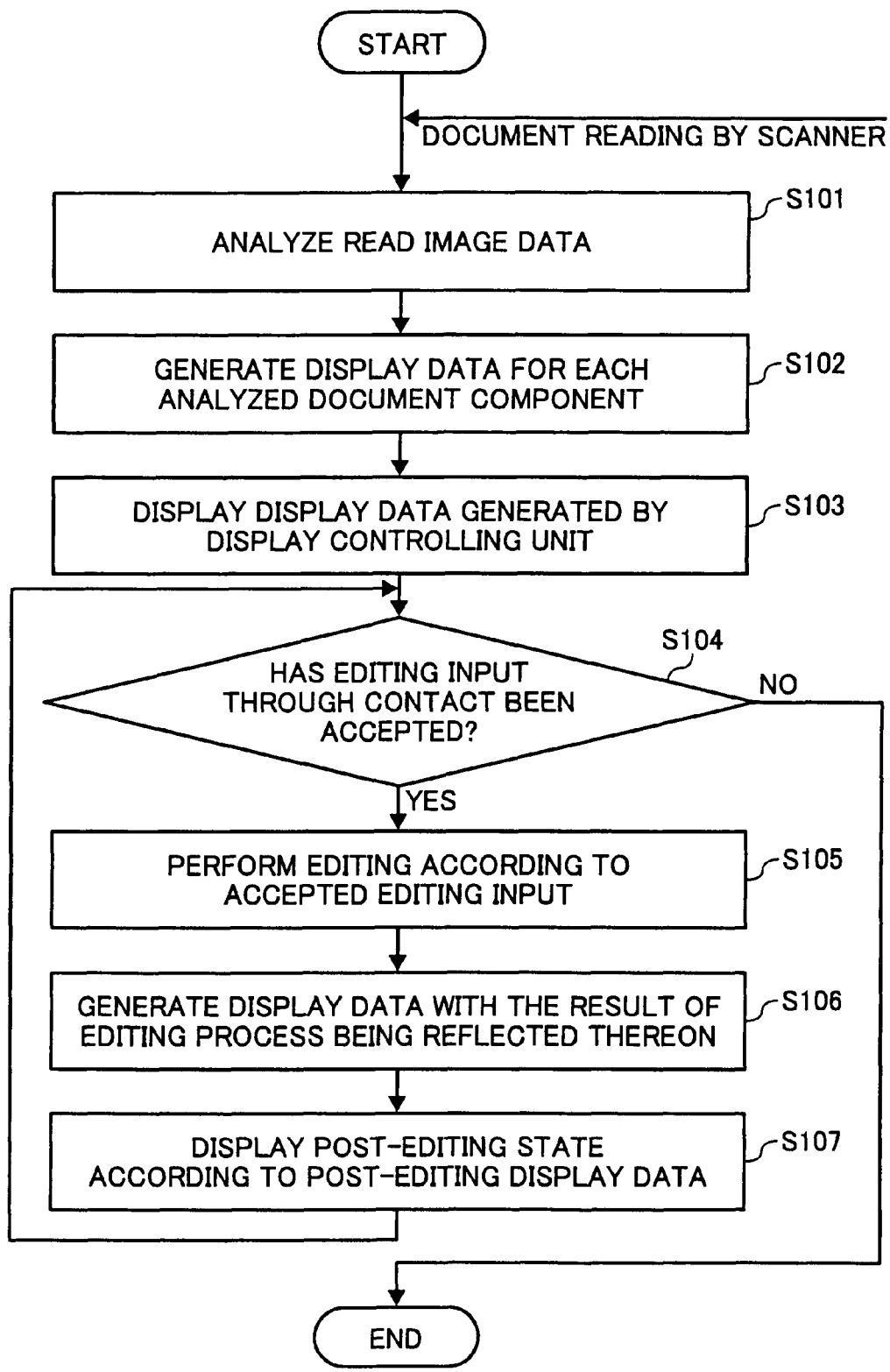
FIG. 7 is a flowchart illustrating a document editing process according to the first embodiment.

FIG. 7 is a flowchart illustrating a document editing process according to the first embodiment. When the scanner 1 reads a document, the image processing unit 2 converts analog data of the read document image to digital data, and the document editing apparatus 10 receives the digital data via the input/output I/F 4. The analyzing unit 12 then analyzes the read image data. Here, based on area identification by the area identifying unit 121 included in the analyzing unit 12 and analyzing of parsing by the parsing unit 122 also included in the analyzing unit 12, the analyzing unit 12 analyzes document components and their attributes. The layout and character information is analyzed by the layout analyzing unit 1211 and the character analyzing unit 1212 included in the area identifying unit 121. The character analyzing unit 1212 performs character analysis through an OCR process, and a character cutting-out process, or others (step S101).

The display control unit 15 generates display data for each analyzed document component. At this time, for each document component, an area defining representation that defines an area on a display at the operation displaying unit 11 is generated (step S102).

The operation displaying unit 11 displays each document component generated by the display control unit 15 with the area of the document component being defined by an area defining representation. As the area defining representation, for example, as depicted in FIG. 6, a display surrounded by a bold solid line is assumed. At this time, the input display module 210 and the editing display module 220 are displayed in parallel. However, if the input image has not been subjected to an editing process yet, the editing display module 220 may be displayed in order to be identical to the input display module 210. At this time, document components in both modules are associated by the associating unit 14 (step S103).

Here, the operation displaying unit 11 detects whether an editing input from the operation has been accepted (step S104). If no editing input is detected ("No" at step S104), the procedure directly goes to an end. The image forming apparatus enters a process of forming an image as being displayed.

On the other hand, when the operation displaying unit 11 has accepted an editing input from the displayed screen ("Yes" at step S104), the editing unit 13 performs an editing process on each of the document components according the accepted editing input (step S105).

The associating unit 14 associates the document components subjected to the editing process with document components in the input display module. The display control unit 15 generates display data in the editing display module 220 according to the association of the document components subjected to the editing processes by the associating unit 14 (step S106).

The operation displaying unit 11 displays the post-editing display data generated by the display control unit 15 as the editing display module 220 (step S107). Then, the procedure returns to step S104 again, where the operation displaying unit 11 accepts an editing input through a touch from the operator. Here, the editing display module 220 representing the post-editing state has been already displayed, and an editing process can be accepted through the editing display module 220 (step S104) Thereafter, steps S105 to S107 and S104 are repeated. If no editing input is accepted by the operation displaying unit 11 ("No" at step S104), the procedure directly goes to an end.

In this manner, in the document editing apparatus according to the first embodiment, the operation displaying unit 11 produces a display with two display modules, that is, the input display module 210 representing an input state and an editing display module representing a post-editing state, accepts a touch input from these two types of display for editing, and displays the editing result. Therefore, various edit settings can be tried on the operation displaying unit 11 for viewing before generating an output, such as printing. In this manner, it is possible to edit document information on a single application through a simple input scheme including a touch input, and then check the post-editing state before output. Therefore, a document editing apparatus that is convenient for document editing operation and efficient in editing work can be achieved.

Figure 8:
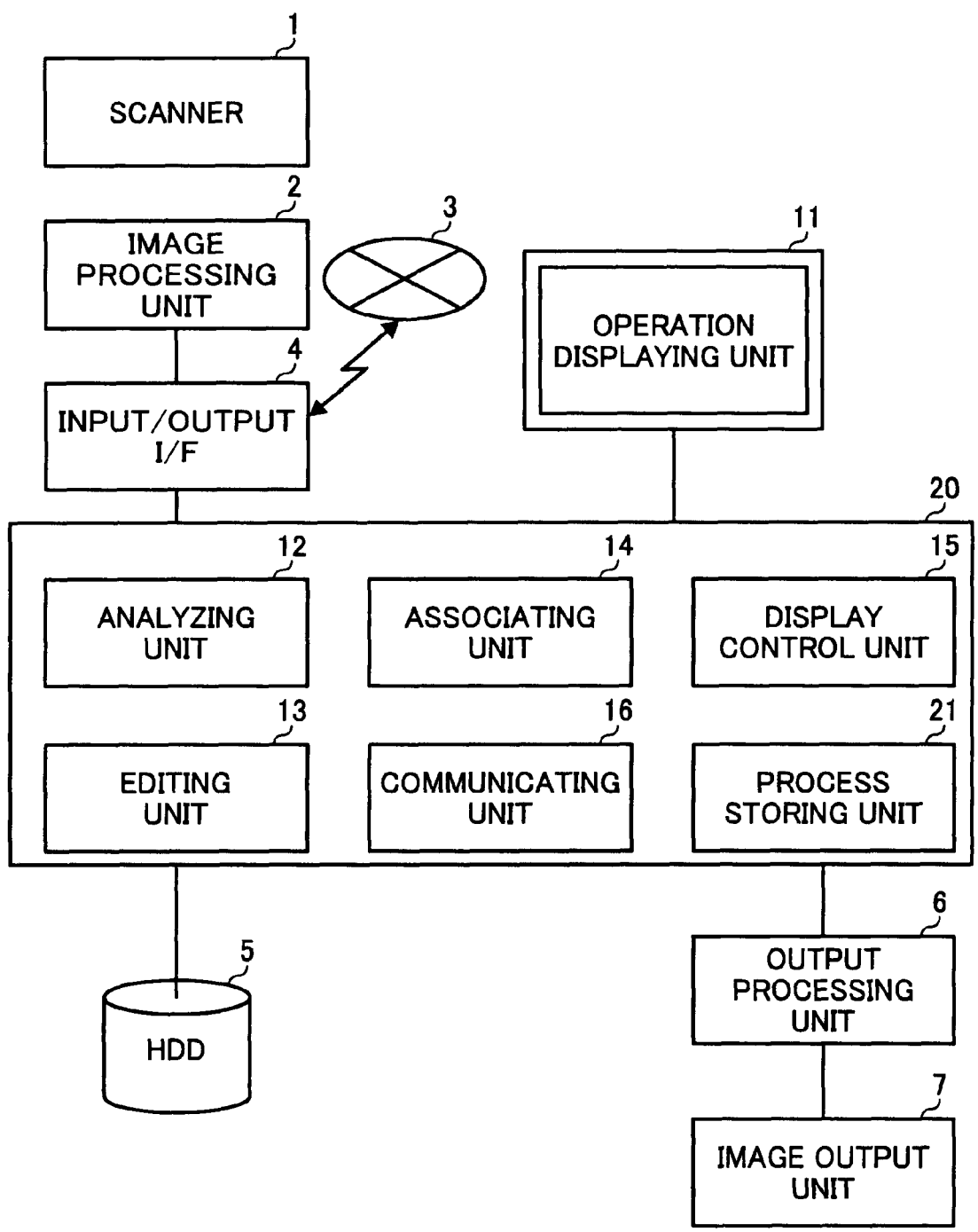
FIG. 8 is a functional block diagram of a document editing apparatus according a second embodiment of the present invention.

FIG. 8 is a functional block diagram of a document editing apparatus 20 according a second embodiment of the present invention. The document editing apparatus 20 according to the second embodiment is different from that according to the first embodiment in that a process storing unit 21 is further included. The process storing unit 21 stores information regarding a process performed on a document component. Then, when the operation displaying unit 11 accepts an input requesting performance of an undo or a redo, the editing unit 13 performs an undo or redo operation based on the process information stored in the process storing unit 21. The display control unit 15 then causes the undo or redo operation process result to be displayed on the operation displaying unit 11.

Here, the process storing unit 21 stores data in all states for each document component subjected to the editing process by the editing unit 13. With this, when an undo or redo operation is performed, the document component can be placed in an editing state corresponding to the operation input.

Figure 9:
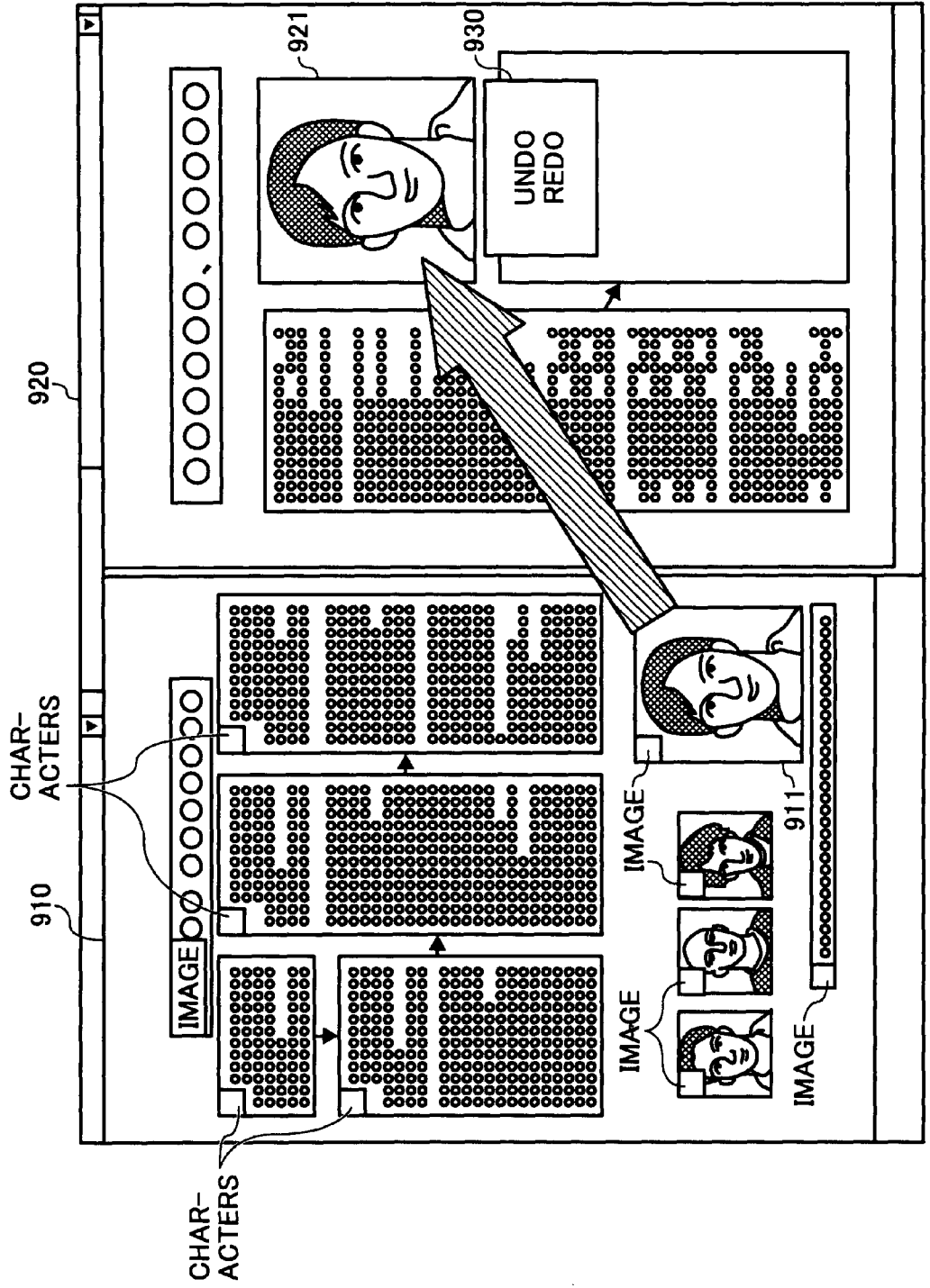
FIG. 9 is a schematic drawing that depicts one example of an undo/redo operation menu.

FIG. 9 is a schematic drawing that depicts one example of an undo/redo operation menu when an image 911 on a display 910 in the input display module is touched and dragged by the operator, thereby causing copy image data to be generated, appearing on a display 920 in the editing display module as a copy image 921. In this state, for example, when the image 921 is double-touched, a pull-down menu 930 for redo and undo is displayed. With either one of redo and undo in the displayed pull-down menu 930 being touched, an undo or redo operation is accepted.

With this configuration, an undo or redo operation can be input via the operation displaying unit 11. Then, based on the accepted undo or redo operation, the post-editing information stored in the process storing unit 21 is read, thereby performing the undo or redo operation. With a display on the operation displaying unit 11, a convenient document editing apparatus with high operability and less operation errors can be provided to the operator.

A document editing apparatus 30 according to a third embodiment of the present invention is different from that according to the first embodiment in that the operation displaying unit 11 can display a document component with a character attribute to be displayed as an character-image document component with an image attribute.

Figure 10A:
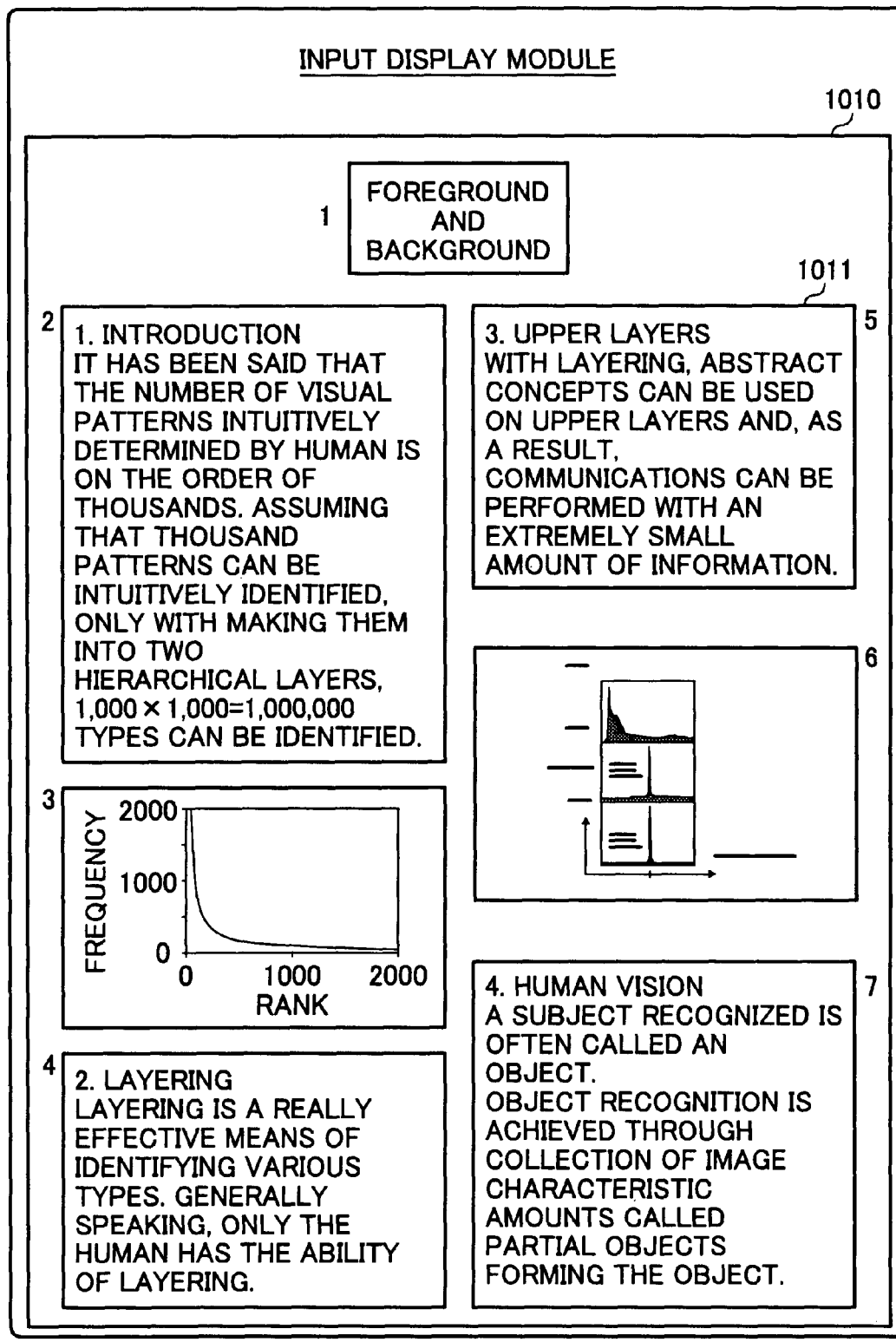
FIG. 10 is a schematic drawing illustrating an attribute change of a character display on a document editing apparatus according to a third embodiment of the present invention.
Figure 10B:
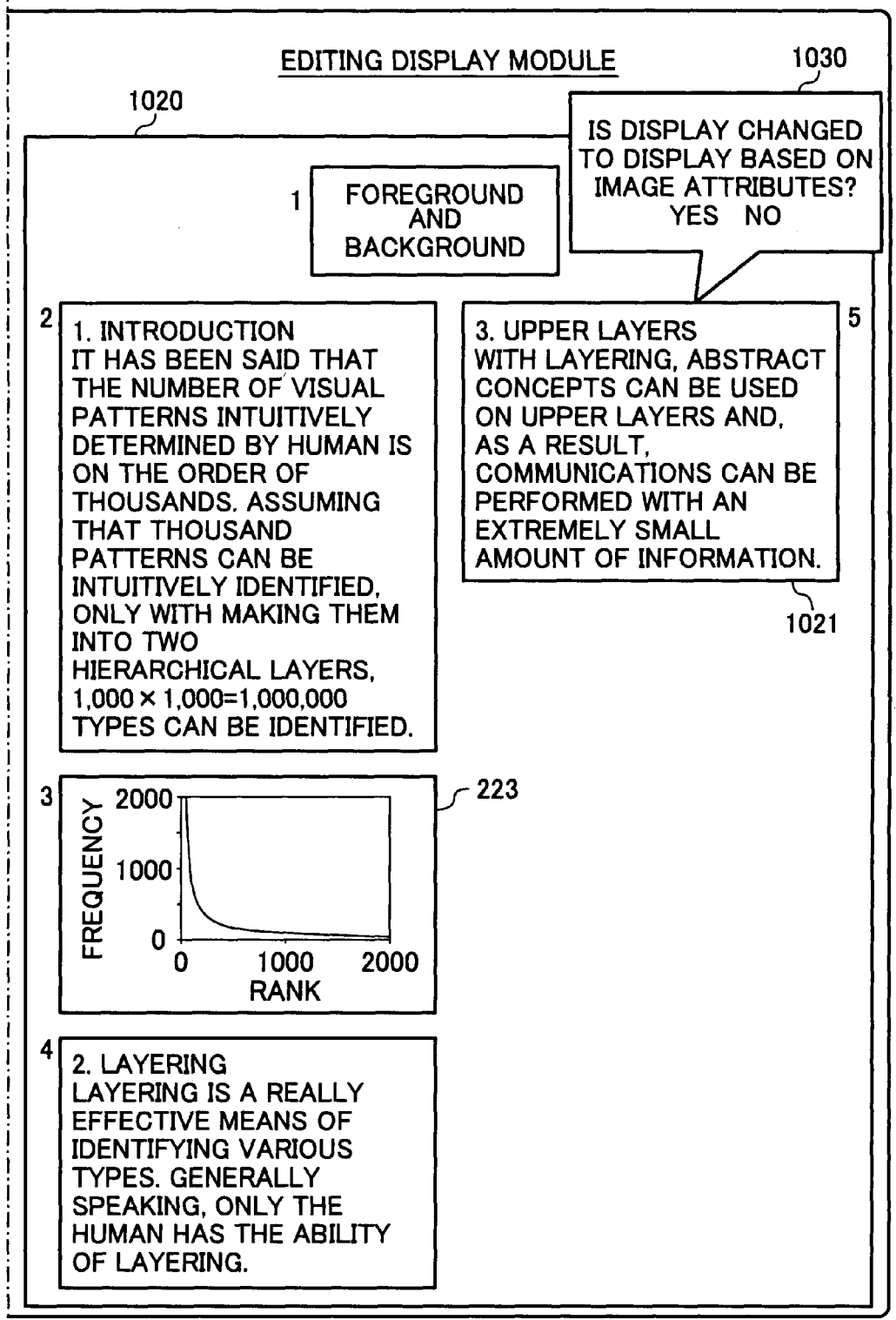

FIG. 10 is a schematic drawing illustrating an attribute change of a character display on the document editing apparatus 30 according to the third embodiment. Now, it is assumed that, when a document component 1011 with a document attribute in an input display module 1010 is displayed as a document component 1021 in an editing display module 1020, the operator desires to select a display with an image attribute due to a low character recognition rate at the analyzing unit 12. In this case, the document component 1021 is double-clicked to display a pull-down menu 1030.

In the pull-down menu 1030, when "Yes" for switching to a display with an image attribute is touched for input, the operation displaying unit 11 accepts this input. The associating unit 14 establishes an association not with document data with a character attribute, but with image data before character analysis by the analyzing unit 12. The display control unit 15 then causes the associated character image data to be displayed on the operation displaying unit 11.

With this, for example, when an OCR process on a character image read by the scanner 1 produces a result at a low character recognition rate, switching can be made such that characters are displayed as the read image information, that is, a document component with an image attribute. Therefore, a more accurate character display can be performed.

Figure 11:
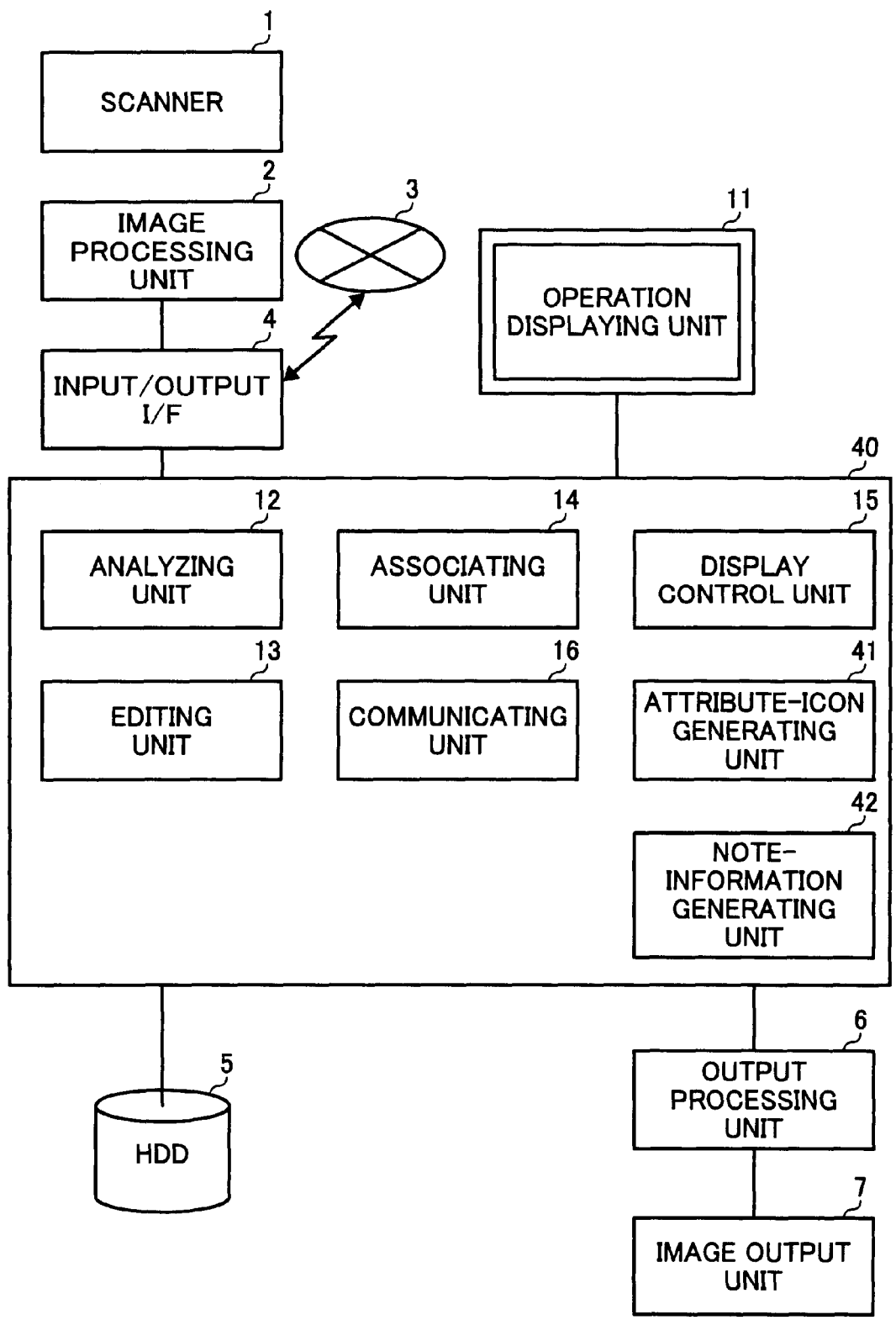
FIG. 11 is a functional block diagram of a document editing apparatus according to a fourth embodiment of the present invention.

FIG. 11 is a functional block diagram of a document editing apparatus 40 according to a fourth embodiment of the present invention. The document editing apparatus 40 according to the fourth embodiment further includes an attribute-icon generating unit 41 and a note-information generating unit 42.

The document editing apparatus 40 according to the fourth embodiment is different from that according to the first embodiment in that the attribute-icon generating unit 41 is further included capable of an icon display on the operation displaying unit 11 for the attribute of the document component to be analyzed irrespectively of the type, language, and writing direction of characters, and that the display control unit 15 causes an icon representing the attribute generated by the attribute-icon generating unit 41 to be displayed on the operation displaying unit 11.

With this, for example, whether the attribute of the document component is a character or image is displayed by an icon, thereby allowing easy visual recognition by the operator. Also, this icon may be literally an icon, or may be a text display.

Furthermore, another difference between the document editing apparatus 40 according to the fourth embodiment and that according to the first embodiment is that the note-information generating unit 42 is further included that generates note information, which is information representing a graphical note containing various explanations on the operation displaying unit 11, allowing note information or editing-process explanation information regarding the document component displayed on the operation displaying unit 11 to be displayed on the operation displaying unit 11 for visual recognition.

The note information is not restricted to screen information on the operation displaying unit 11, and may be audio information. This is for the purpose of not restricting recognition by visual recognition but allowing acoustic recognition.

Figure 12A:
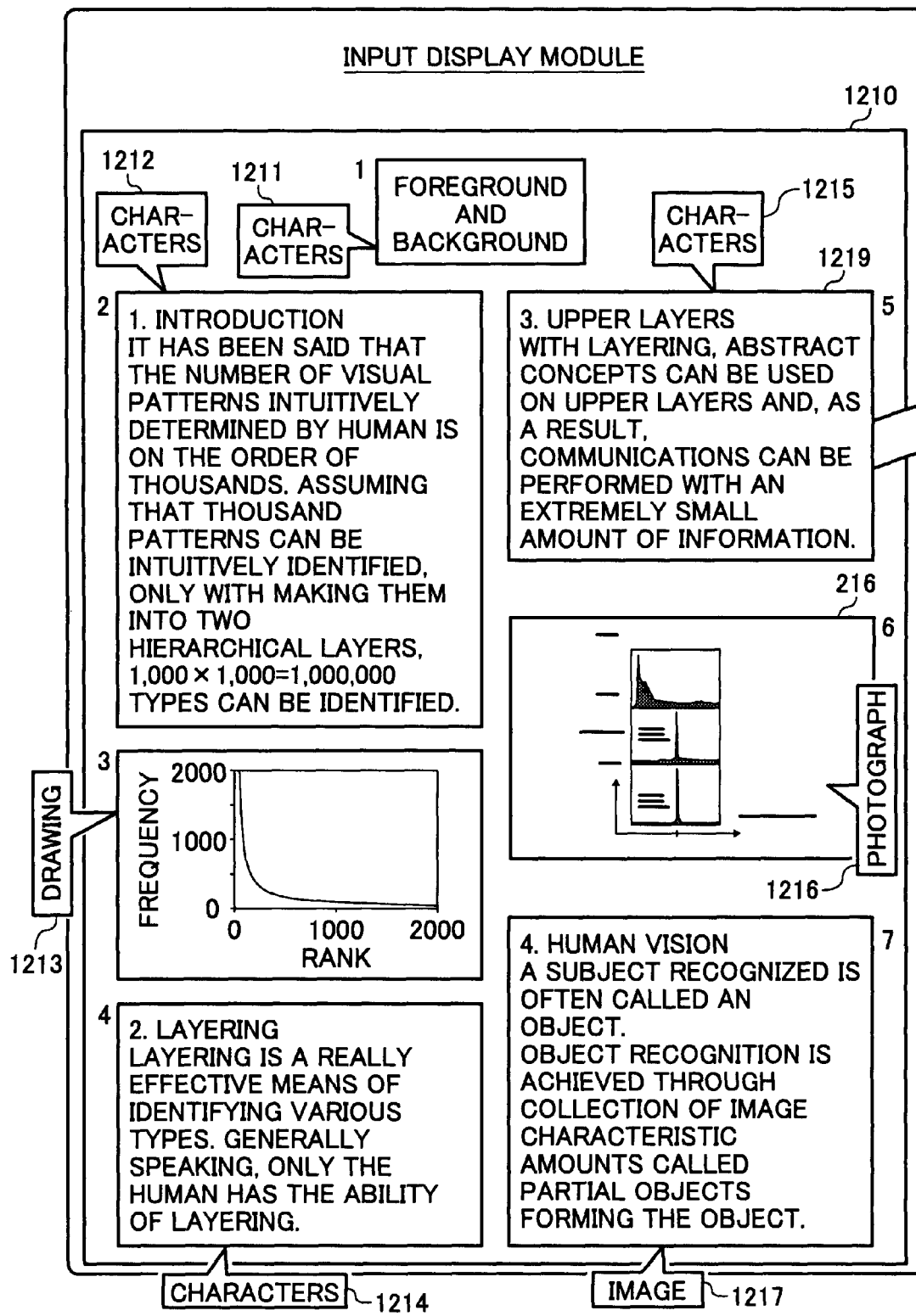
FIG. 12 is a drawing illustrating a display on the document editing apparatus according to the fourth embodiment.
Figure 12B:
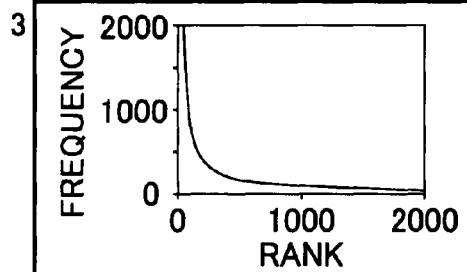

FIG. 12 is a drawing illustrating a display on the document editing apparatus 40 according to the fourth embodiment. On the operation displaying unit 11, based on the attribute icon information generated by the attribute-icon generating unit 41, icons 1211 to 1217 and 1221 each representing an attribute are displayed.

In addition, based on the note information generated by the note-information generating unit 42, on the operation displaying unit 11, notes "delete" 1231 and 1232 are displayed indicating that document components are deleted on a display in the editing display module 1220. Also, a note "delete process performed" 1240 is displayed indicating that a delete process has been performed in the editing display module 1220.

The graphical notes and attribute icons can be displayed through a draw operation via a pointing device displayed on the operation displaying unit 11. For example, a document component 1219 displayed in an input display module 1210 depicted in FIG. 12 is brought to the edit displaying module 1220 through a draw operation by a touch input, the pointing device is drawn to a draw operation position, thereby a corresponding graphical note or an attribute icon display 1221 is displayed at the draw position. With this, appropriate note and attribute icons are graphically displayed without particularly requiring an operation, such as clicking, thereby achieving excellent operability.

For the pointing device representing a draw operation on the operation displaying unit 11, the use of a plurality of colors is preferable. For example, with a display in a color corresponding to the attribute of the document component to be drawn, the attribute of the document component can be visually recognized before a draw is completed, thereby increasing operability and efficiency. For example, the color of the pointing device is blue when the document component with a character attribute is drawn, whilst the color of the pointing device is red when the document component with an image attribute is drawn.

Figure 13:
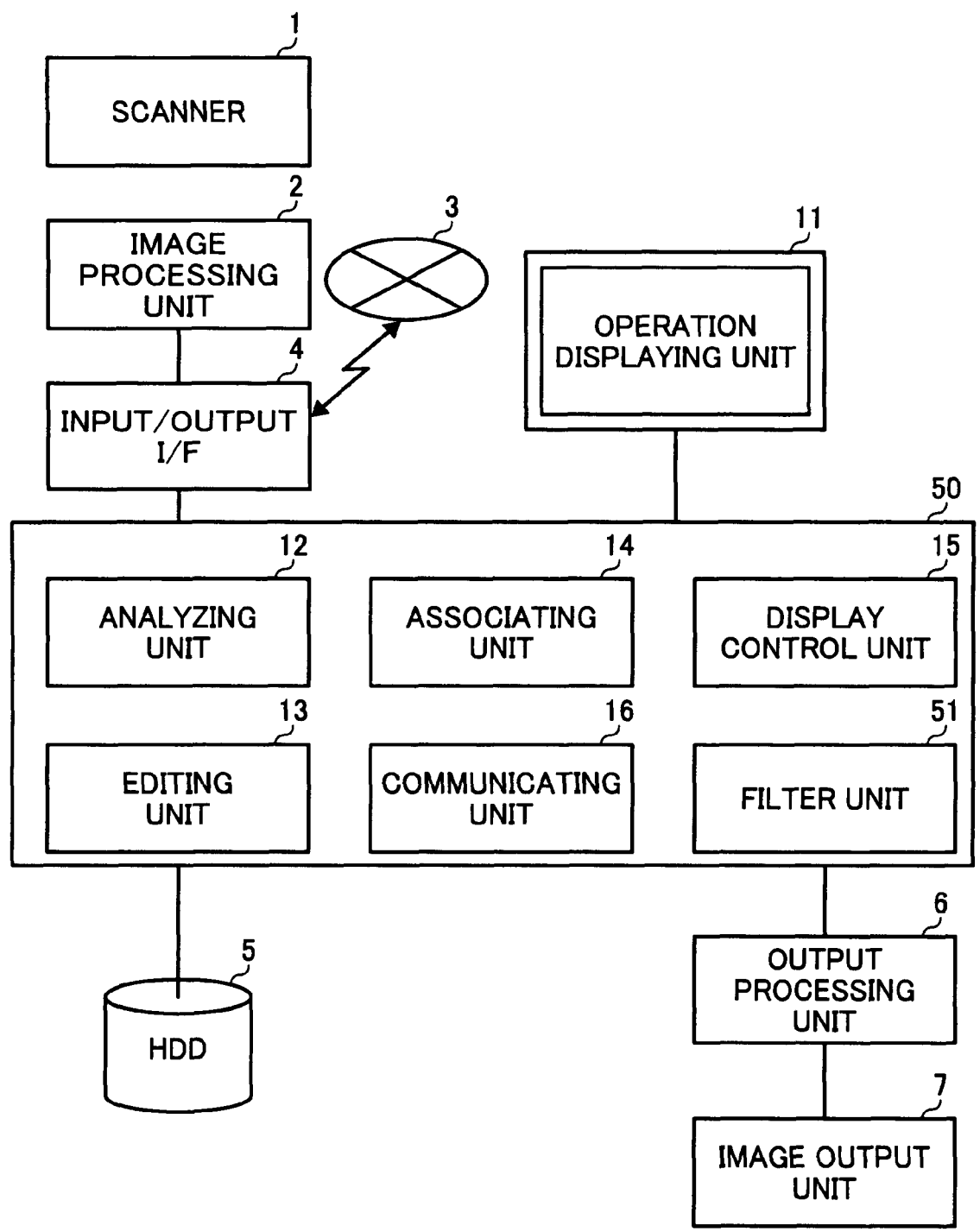
FIG. 13 is a functional block diagram of a document editing apparatus according to a fifth embodiment of the present invention.

FIG. 13 is a functional block diagram of a document editing apparatus 50 according to a fifth embodiment of the present invention. The document editing apparatus 50 according to the fifth embodiment further includes a filter unit 51.

The document editing apparatus 50 according to the fifth embodiment is different from that according to the first embodiment in that the filter unit 51 that performs a filter process on a document component is included.

Figure 14:
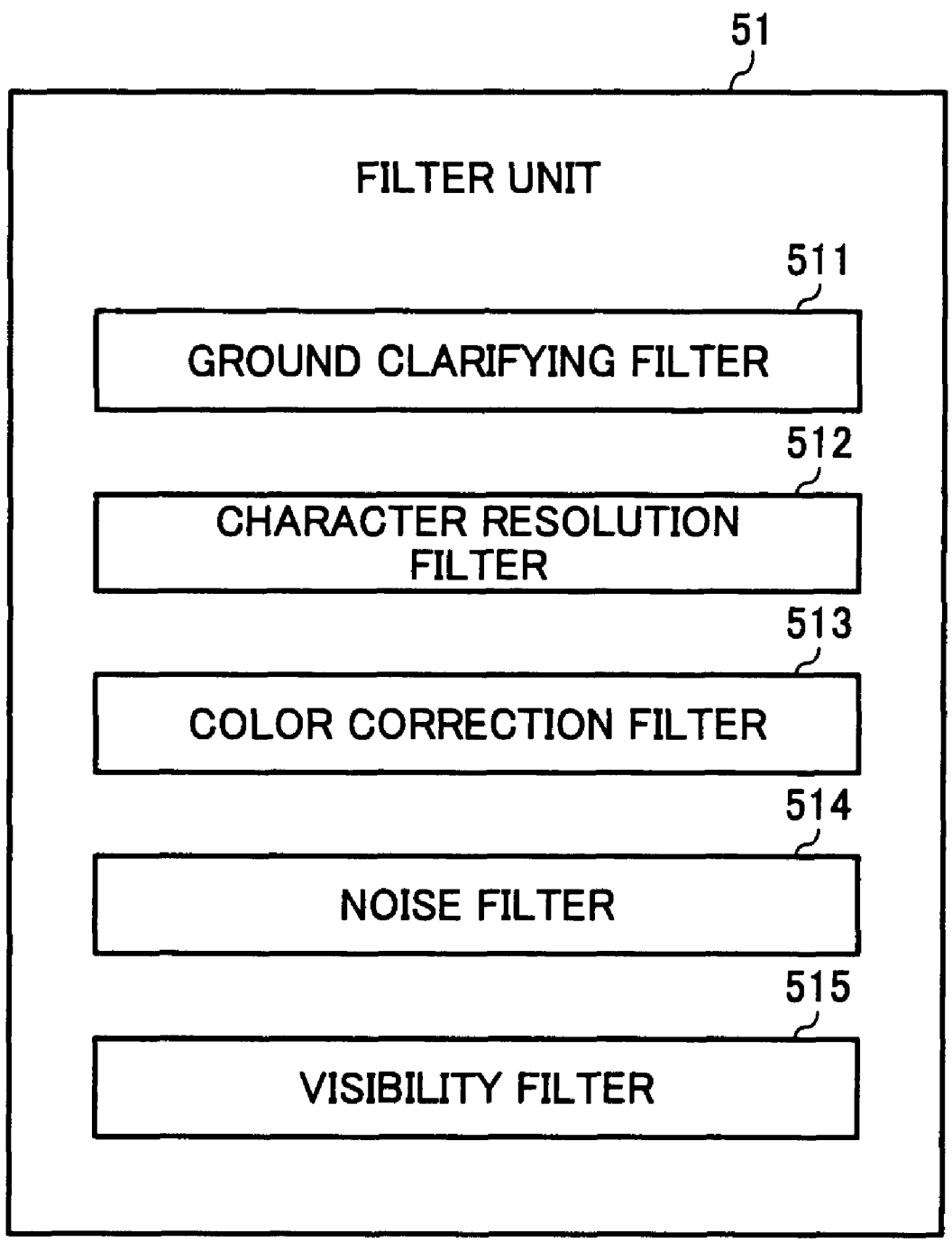
FIG. 14 is a functional block diagram of a filter unit.

FIG. 14 is a functional block diagram of the filter unit 51. The filter unit 51 includes a ground clarifying filter 511, a character resolution filter 512, a color correction filter 513, a noise filter 514, and a visibility filter 515.

The ground clarifying filter 511 clarifies the ground. The ground clarifying filter 511 is particularly effective for clarifying the ground in a non-halftone image, such as a character image. The character resolution filter 512 improves a character resolution. The color correction filter 513 performs a color correction filter operation. The noise filter 514 cuts noise off. The visibility filter 515 performs a filter process of correcting geometric distortion and changing visibility.

Here, the filter unit 51 preferably performs a filter process by selecting various filters according to the attribute of the document component obtained through analysis by the analyzing unit 12. That is, various filters are applied and this application is released according to the attribute of the document component obtained through analysis by the analyzing unit 12.

Figure 15:
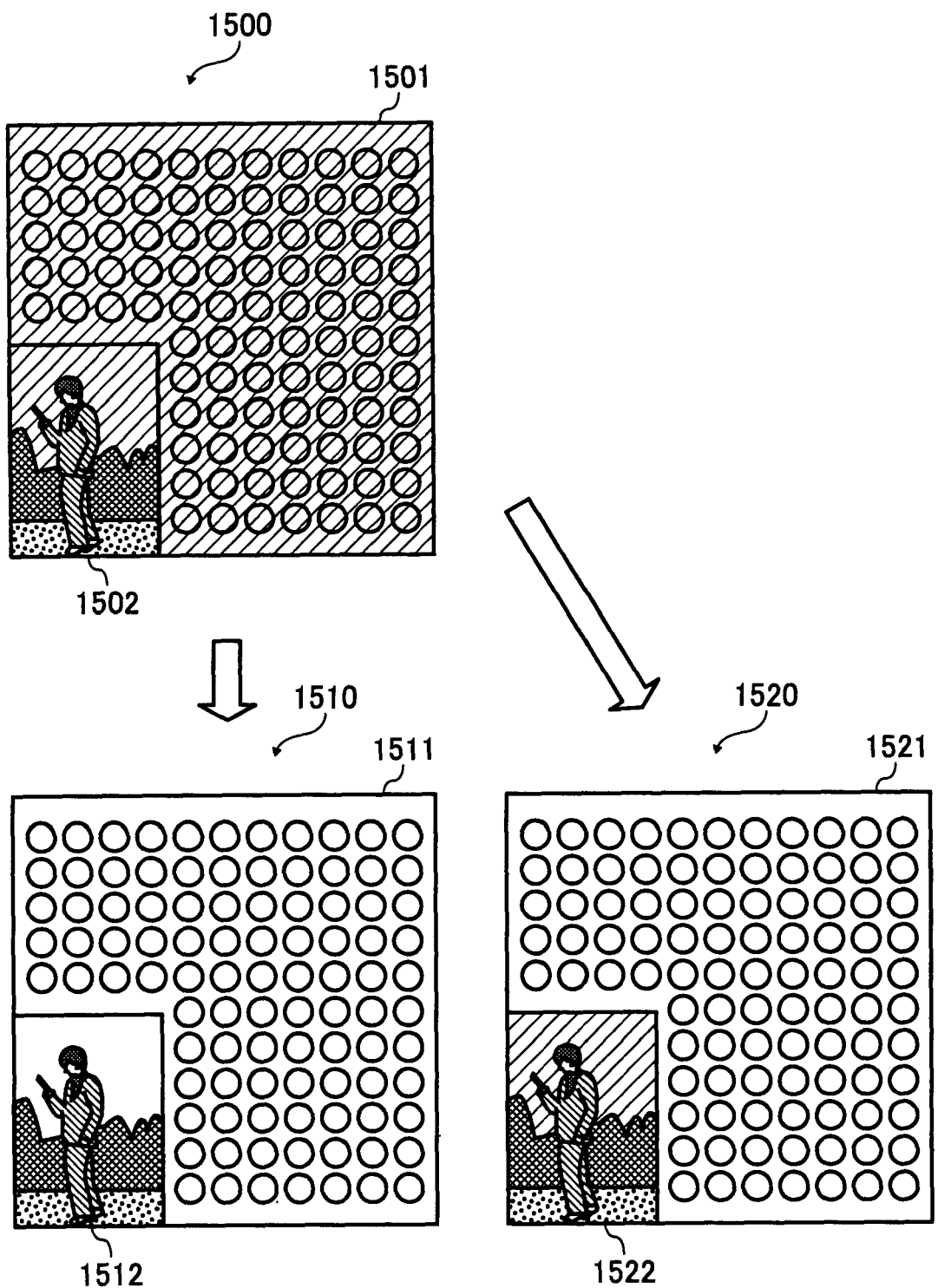
FIG. 15 is a drawing illustrating a display subjected to a filter process on the document editing apparatus according to the fifth embodiment.

FIG. 15 is a drawing illustrating a display subjected to a filter process on the document editing apparatus 50 according to the fifth embodiment. A display 1500 on the operation displaying unit 11 is a display before a filter process is performed. Here, the entire background is in dark color.

The filter unit 51 clarifies the ground through the ground clarifying filter 511. However, if a process by the ground clarifying filter 511 is performed on the entire display, the display becomes as a display 1510 with the entire ground being removed. In the display 1510, the ground is removed also from a photograph 1512, which is a halftone image, resulting in an inappropriate process.

To get around this, when the analyzing unit 12 determines as a result of analysis that the attribute of the document component is a character, the filter unit 51 applies the ground clarifying filter 511 to clarify the ground. However, when the analyzing unit 12 determines as a result of analysis that the attribute of the document component is a halftone image, such as a photograph, the filter unit 51 does not apply the ground clarifying filter 511.

As a result, with the filter unit 51 applied to the document editing apparatus 50 according to the fifth embodiment, as depicted in a display 1520, a display is such that a ground clarifying process is performed on a character image 1521 but not on a photographic image 1522, which is displayed with natural background brightness.

It is assumed that the filter unit 51 automatically performs a filter process. Alternatively, a filter process can be performed by inputting a setting from an operator through a pull-down menu on the operation displaying unit 11.

In this manner, with suitable application of a filter according to the attribute of the document component by selecting an appropriate filter or releasing the application, an appropriate filter process can be performed for each attribute of each document component. Therefore, a fine editing process with high image quality and a display of the editing result can be performed.

Figure 16:
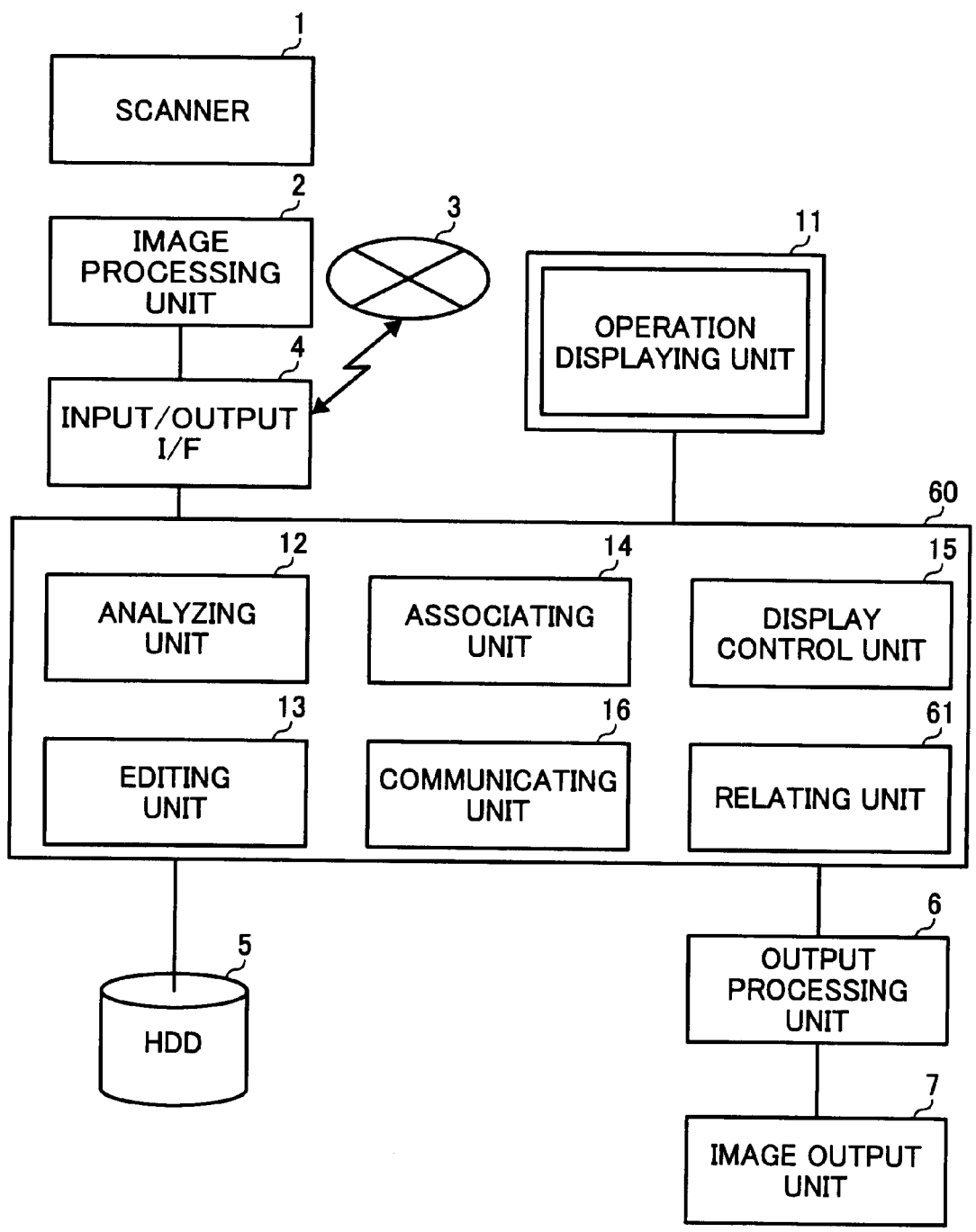
FIG. 16 a functional block diagram of a document editing apparatus according to a sixth embodiment of the present invention.

FIG. 16 a functional block diagram of a document editing apparatus 60 according to a sixth embodiment of the present invention. The document editing apparatus 60 further includes a relating unit 61.

The document editing apparatus 60 according to the sixth embodiment is different from that of the present embodiment 1 in that the relating unit 61 is included to link or associate document components obtained through analysis by the analyzing unit 12 together based on the attributes of the document components.

The operation displaying unit 11 displays document components linked together by the relating unit 61 in a linked form. Also, the operation displaying unit 11 displays document components associated together by the relating unit 61 in an associated form.

In addition, the operation displaying unit 11 accepts an input for linking or associating document components from the operator. With this, it is possible to link or associate document components which have not been linked or associated together by the relating unit 61 but are linked or associated together by the operator.

The operation displaying unit 11 preferably displays a link or association between document components produced by the relating unit 61 with a representation by arrows, because the operator can visually recognize the relation between the document components with ease by visually recognizing the arrows.

The relating unit 61 links or associates the document components analyzed by the analyzing unit 12 based on the attributes of the document components. When the document components are associated based on the attributes, an editing operation can be improved by making the operator aware of the attributes.

For example, from the results obtained by the parsing unit 122 of the analyzing unit 12 through an analysis of the order of description of the document components and the attributes of the document components obtained through an analysis by the analyzing unit 12, only the document components with a common attribute that are associated based on the order of sequence can be displayed on the operation unit. With this, for example, only characters or images can be collected, thereby making it easier to visually recognize the relation between the document components.

The relating unit 61 relates the attributes of the document components together in association to the order of description, and the operation displaying unit 11 produces a display with an order representation representing the order of description associated by the relating unit.

Figure 17:
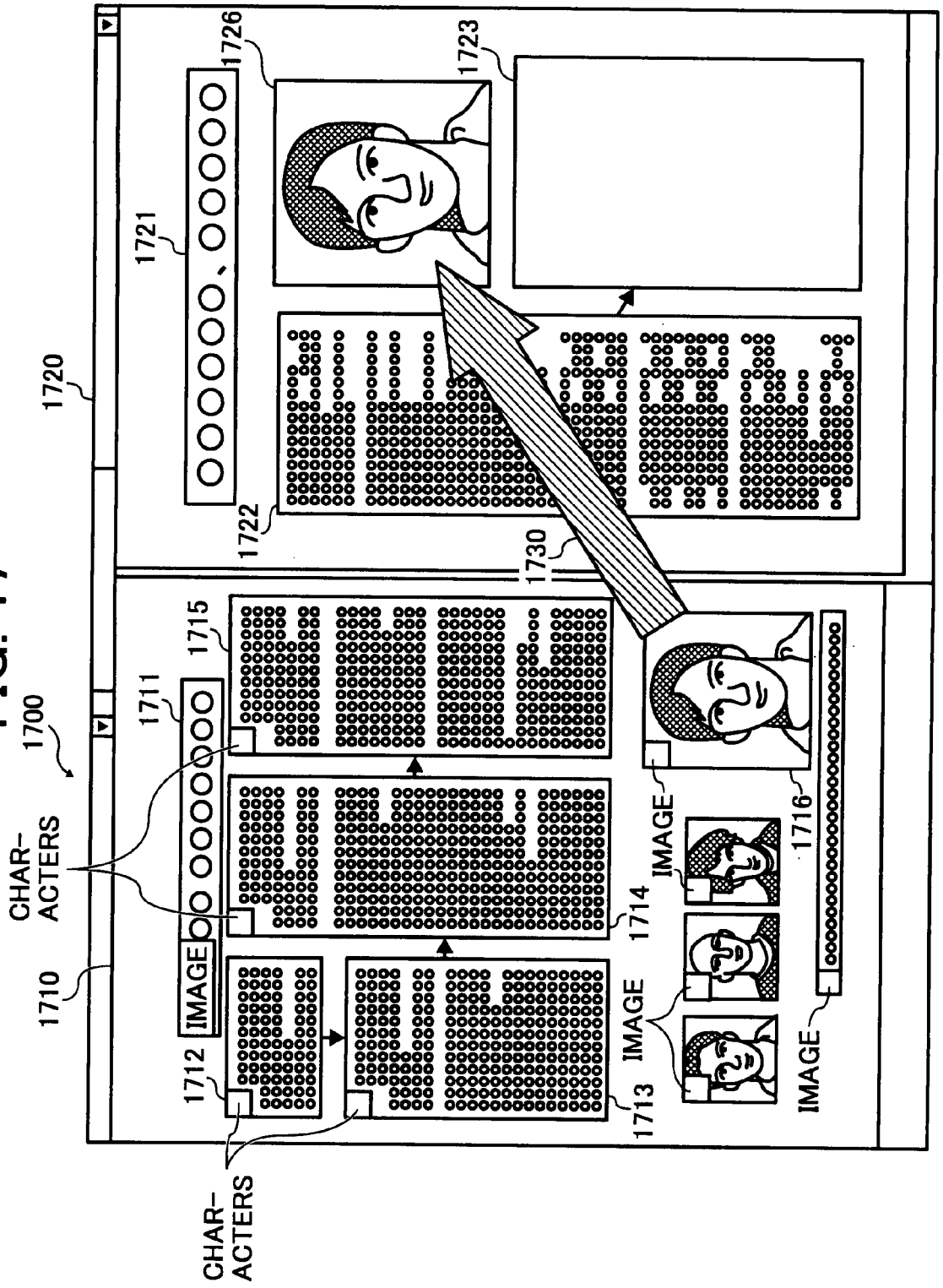
FIG. 17 is a drawing illustrating a display edited by the document editing apparatus according to the sixth embodiment.

FIG. 17 is a drawing illustrating a display edited by the document editing apparatus 60 according to the sixth embodiment. In an input display module 1710 displayed on the operation displaying unit 11, document components 1712 to 1715 with a character attribute are displayed with arrows representing the order of description. Also, an image 1716 is displayed.

On the other hand, in an editing display module 1720, document components 1722 and 1723 with a character attribute and an image 1726 are displayed. Here, the document components 1712 to 1715 with a character attribute are arranged according to the order of description associated by the relating unit 61 into the document components 1722 and 1723 with the order being maintained. The original image 1716 is edited 1730 to be enlarged for display (image 1726).

In this manner, editing is performed such that the document components with the same attribute that are associated with one another by the relating unit 61 is associated to be as one, thereby producing an associated display. With this, for example, portions of a document divided according to the order of description are collectively displayed with the order being maintained, thereby achieving a display allowing the structure of the document to be visually recognized with ease.

Figure 18:
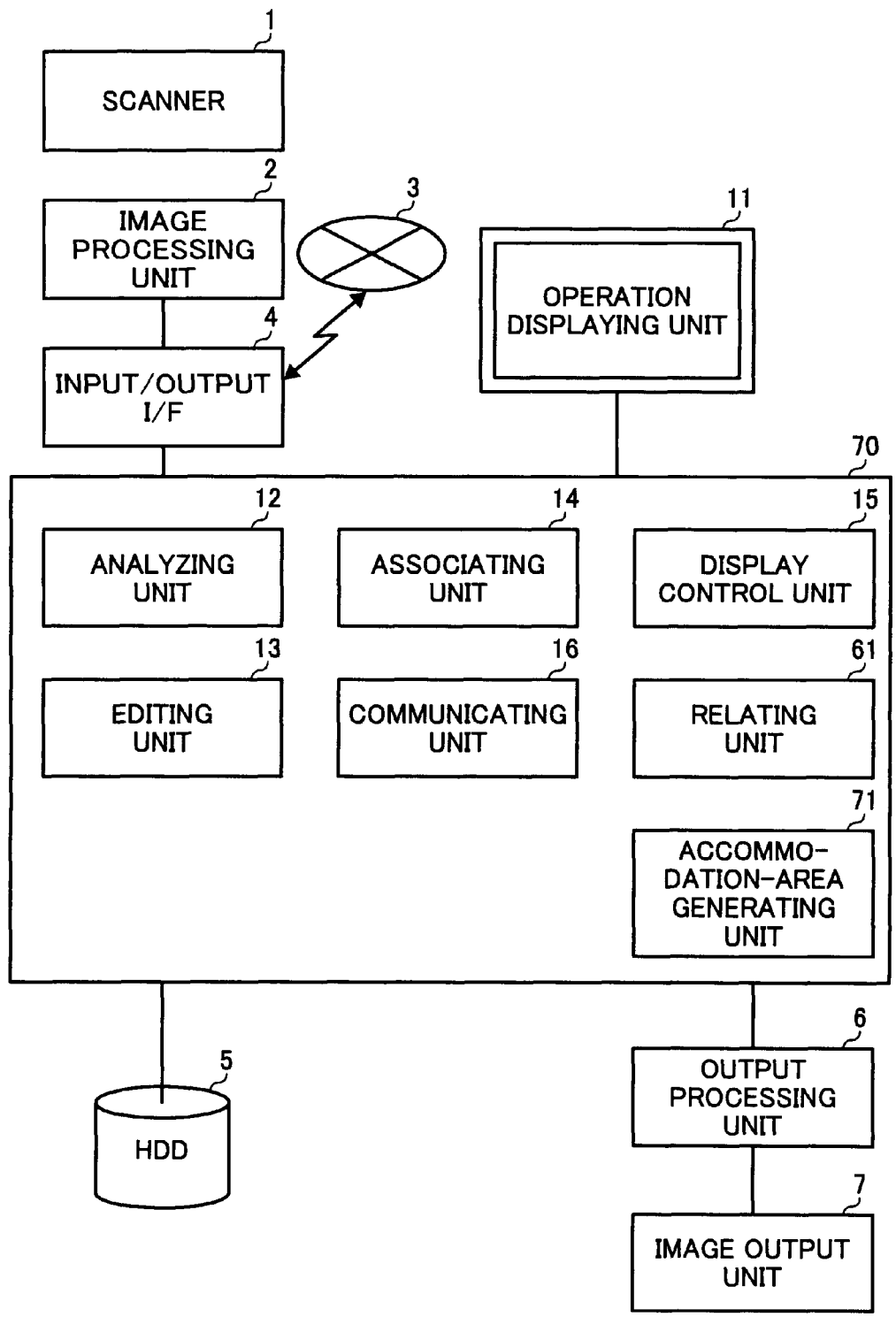
FIG. 18 is a functional block diagram of a document editing apparatus according to a seventh embodiment of the present invention.

FIG. 18 is a functional block diagram of a document editing apparatus 70 according to a seventh embodiment of the present invention. The document editing apparatus 70 further includes, in addition to the relating unit 61, an accommodation-area generating unit 71.

The document editing apparatus 70 according to the seventh embodiment is different from that according to the sixth embodiment in that the accommodation-area generating unit 71 generates information about an accommodation area representation for display by occupying a predetermined area in a form of an area that can accommodate a document component on a display of the operation displaying unit 11, and that the display control unit 15 then causes the accommodation area representation that can accommodate the document component to be displayed on the operation displaying unit 11 based on the information about the accommodation area representation generated by the accommodation-area generating unit 71.

Another difference between the document editing apparatus 70 according to the seventh embodiment and that according to the sixth embodiment is that the editing unit 13 performs editing such that a document component to be inserted according to a request for inserting in an accommodation area representation is accommodated in the accommodation area representation, and that the display control unit 15 causes the operation displaying unit 11 to produce a display with the document component being accommodated in the accommodation area representation.

In insertion of the document component in the accommodation area representation, the display control unit 15 changes a display size so that the document component can fit in the displayed accommodation area representation displayed on the operation displaying unit 11. In the case of an image, for example, image information is compressed by, for example, decimating pixel points having pixel values. In this manner, a display can be produced so that a desired document component is accommodated without changing the size of the accommodation area.

In addition, when performing insertion of the document component in the accommodation area representation, the editing unit 13 changes a display size so that the document component can fit in the displayed accommodation area representation displayed on the operation displaying unit 11. In this manner, an editing process can be performed so that a desired document component is accommodated without changing the size of the accommodation area.

Furthermore, when performing insertion of the document component in the accommodation area representation, in the case where the document component to be inserted is an image, the display control unit 15 compresses or decompresses the image capacity, thereby causing the image to be displayed on the operation displaying unit 11 as an image file being inserted and suitable for the size of the accommodation area representation.

Moreover, in the case where the document component to be inserted has characters, the character size is changed. With this, in the case where the document component has characters, the document component can be accommodated in the accommodation area representation without changing the size of the accommodation area.

Similarly, when performing insertion of the document component in the accommodation area representation, in the case where the document component to be inserted is an image, the editing unit 13 compresses or decompresses the image capacity, thereby performing editing as an image file suitable for the size of the accommodation area representation.

In the case where the document component to be inserted is formed of characters, the character size is changed. As such, the document component is formed of characters, an editing process is performed so that the document component can be accommodated without changing the size of the accommodation area. With this, the data size can be made suitable. Therefore, also for image output by the image output unit 7, the image can be output with a suitable data size.

When the relating unit 61 (FIG. 18) links a document component with a character attribute and a plurality of accommodation area representations displayed on the operation displaying unit 11, the editing unit 13 accepts and executes a process request for inserting the same document component with a character attribute in the accommodation area representations linked to the document component with a character attribute displayed on the operation displaying unit 1. With this, it is possible to simultaneously insert one document component formed of characters in other plurality of accommodation area representations based on linking.

When the relating unit 61 (FIG. 18) links a document component with a character attribute and a plurality of accommodation area representations displayed on the operation displaying unit 11, if accepting a process request for inserting the document component with a character attribute displayed on the operation displaying unit 11 by being divided into the linked accommodation area representations, the editing unit 13 performs a process of dividing the document component for insertion in the accommodation area representations. With this, if an attempt is made to insert one document component having characters in an accommodation area representation at another location but in vain due to shortage of capacity for the number of characters to be accommodated, the document component can be divided for insertion in another linked accommodation area representation. Therefore, it is possible to prevent a situation such that an inserting operation ends with the document being inserted incompletely.

The operation displaying unit 11 accepts a request input for insertion of the document component in the accommodation area representation via a user interface displayed. The editing unit 13 performs an editing process according to the accepted request input. The display control unit 15 causes the operation displaying unit 11 to again display the state after processing.

Upon the request for inserting the document component in the accommodation area representation, the editing unit 13 performs an inserting process based on the analysis of the document component by the analyzing unit 12. The display control unit 15 causes the operation displaying unit 11 to display the state after insertion. With this, the state after the editing process can always be displayed.

Figure 19:
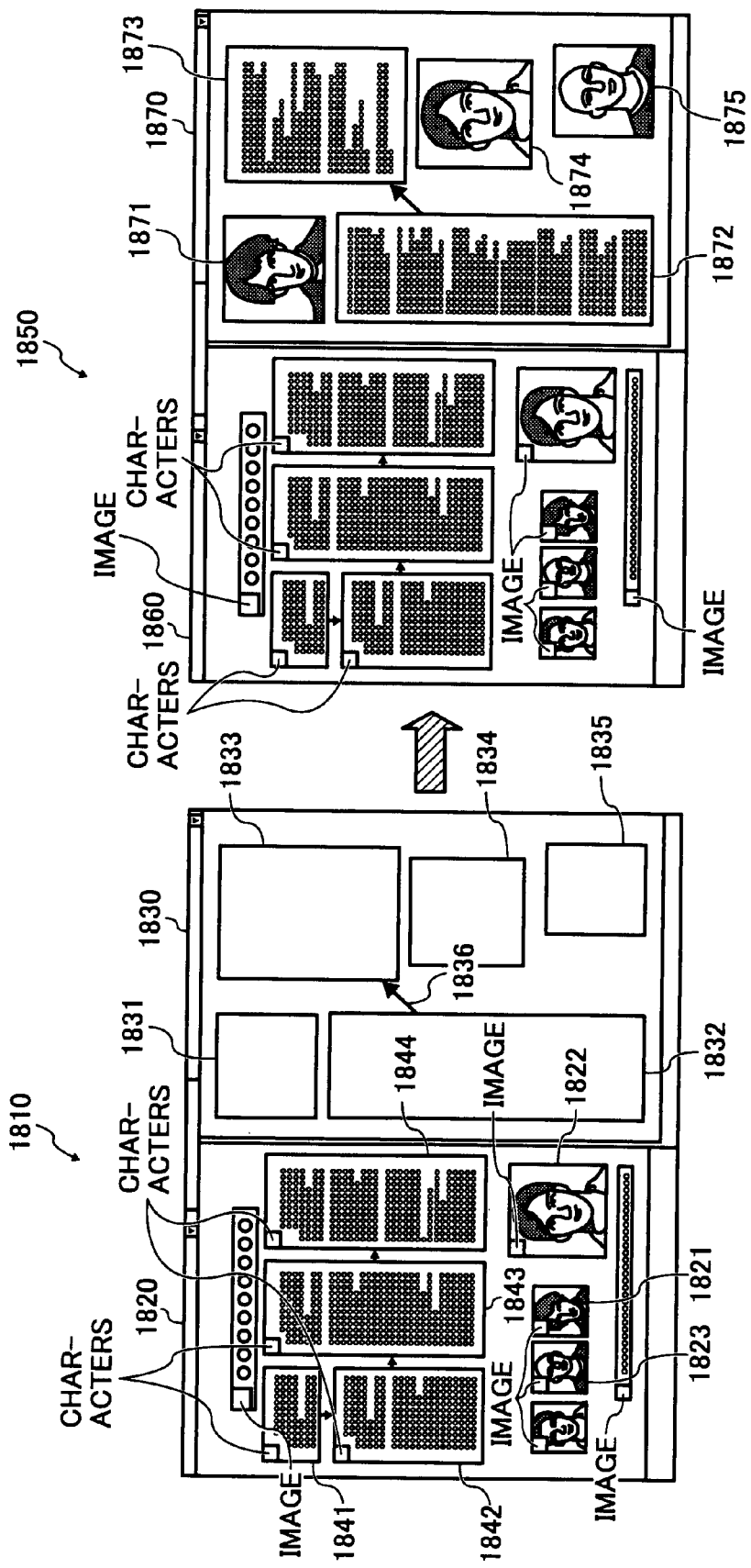
FIG. 19 is a drawing illustrating a case where a document component is inserted in an area defining representation on the document editing apparatus according to the seventh embodiment.

FIG. 19 is a drawing illustrating a case where a document component is inserted in an accommodation area representation on the document editing apparatus 70 according to the seventh embodiment. A display is presented such that a pre-insertion screen 1810 is changed to a post-insertion screen 1850.

On the pre-insertion screen 1810, an input display module 1820 and an editing display module 1830 are displayed in parallel. Also, on the post-insertion screen 1850, an input display module 1860 and an editing display module 1870 are displayed in parallel In the editing display module 1830, accommodation area representations 1831 to 1835 are displayed without insertion of a document component. Here, the accommodation area representations 1832 and 1833 are associated with each other, and an arrow 1836 representing this association is displayed.

The operator brings a document component in the input display module 1820 on the left to the accommodation area representations 1831 and 1835 in the editing display module 1830 on the right through a drag operation. A display after insertion is represented by the editing display module 1870. Here, a document component 1821 is inserted in the accommodation area representation 1831, and is displayed as a document component 1871.

Similarly, a document component 1822 is inserted in the accommodation area representation 1834, and is displayed as a document component 1874. Furthermore, a document component 1823 is inserted in the accommodation area representation 1835, and is displayed as a document component 1875.

The accommodation area representations 1832 and 1833 are associated as having the same attribute, and the order is also set by this association. Therefore, when document components with a character attribute are inserted, they are embedded in this order. As a result, in the editing display module 1870, document components 1841 to 1844 having characters are sequentially inserted in that order in accommodation area representations 1872 and 1873.

The operation displaying unit 11 displays a pointing device that can perform at least any one of processes including move, size change, copy, and delete on the accommodation area representation displayed on the operation displaying unit 11, and accepts an input from that display. For example, the pointing device can be double-clicked to cause a pull-down menu to be displayed, thereby allowing an item to be selected from the display for setting. The editing unit 13 performs a process according to the input accepted from the pull-down menu on the operation displaying unit 11. With this, a convenient operation can be performed by using a pointing device.

Figure 20:
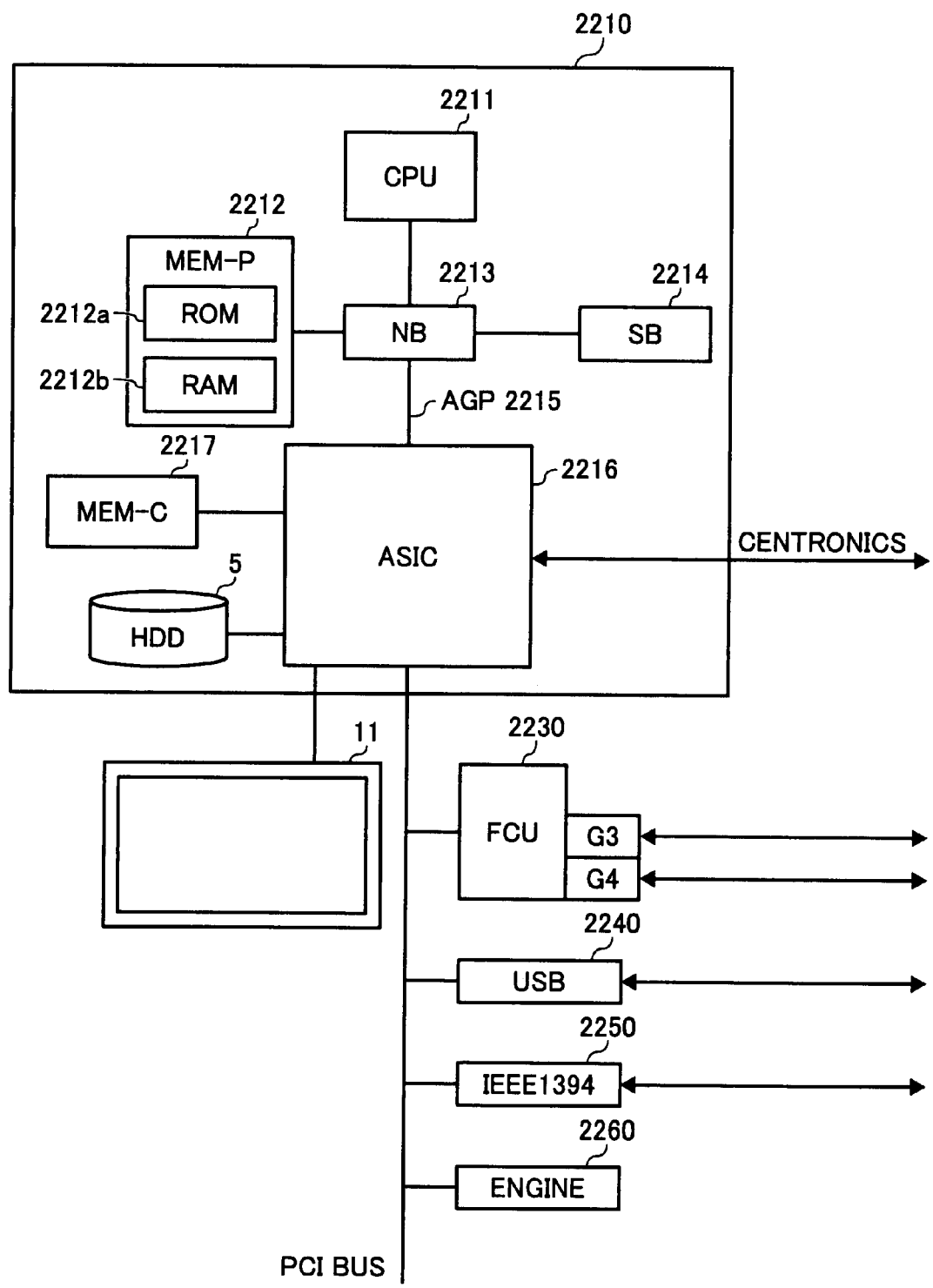
FIG. 20 is a block diagram of a hardware configuration of the image forming apparatus according to the present embodiments.

FIG. 20 is a block diagram of a hardware configuration of the image forming apparatus according to the present embodiments. The image forming apparatus is configured to be a Digital Multifunction Product (MFP) with multifunction, such as facsimile and scanner functions. As depicted in the drawing, the MFP is configured with a controller 2210 and an engine unit 2260 being connected to each other via a Peripheral Component Interconnect (PCI) bus. The controller 2210 is a controller that controls an input from an FCU I/F 2230 and the operation displaying unit 11 by performing, for example, control over the entire MFP, image display control, various controls, and image processing control. The engine unit 2260 is an image processing engine connectable to the PCI bus, and includes, for example, image processing portions for error diffusion, gamma transformation on the obtained image data, and others.

The controller 2210 includes a Central Processing Unit (CPU) 2211, a northbridge (NB) 2213, a system memory (MEM-P) 2212, a southbridge (SB) 2214, a local memory (MEM-C) 2217, an Application Specific Integrated Circuit (ASIC) 2216, and the HDD 5, with the NB 2213 and the ASIC 2216 being connected therebetween with an Accelerated Graphics Port (AGP) bus 2215. Also, the MEM-P 2212 further includes a Read Only Memory (ROM) 2212*a* and a Random Access Memory 2212*b*.

The CPU 2211 performs controls over the entire MFP, includes a chip set formed of the NB2213, the MEM-P 2212 and the SB 2214, and is connected to other devices via this chip set.

The NB 2213 is a bridge for connection of the CPU 2211 with the MEM-P 2212, the SB 2214, and the AGP bus 2215, and includes a memory controller that controls reading and writing with respect to the MEM-P 2212, a PCI master, and an AGP target.

The MEM-P 2212 is a system memory for use as, for example, a memory for storing programs and data or a memory for developing programs and data, and includes the ROM 2212a and the RAM 2212b. The ROM 2212a is a read-only memory for use as a memory for storing programs and data, whilst the RAM 2212b is a writable and readable memory for use as, for example, a memory for developing programs and data or an image rendering memory at the time of image processing.

The SB 2214 is a bridge for connection of the NB 2213 with PCI devices and peripheral devices. The SB 2214 is connected to the NB 2213 via the PCI bus. To this PCI bus, the FCU I/F 2230 is also connected, for example.

The ASIC 2216 is an Integrated Circuit (IC) dedicated to multimedia information processing, includes hardware components for multimedia information processing, and serves as a bridge for connecting the AGP bus 2215, the PCI bus, the HDD 5, and the MEM-C 2217.

The ASIC 2216 includes a PCI target, an AGP master, an arbiter (ARB), which is a core of the ASIC 2216; a memory controller that controls the MEM-C 2217, and a plurality of Direct Memory Access Controllers (DMACs) for image data rotation and others by a hardware logic and others. Between these components included in the ASIC 2216 and the engine unit 2260 via the PCI bus, a Universal Serial Bus (USB) 2240, and the Institute of Electrical and Electronics Engineers (IEEE) 1394 interface 2250 are connected.

The MEM-C 2217 is a local memory for use as an image buffer for transmission or a coding buffer. The HDD 5 is a storage for storing image data, programs, font data, and forms.

The AGP bus 2215 is a bus interface for a graphics accelerator card suggested for increasing the speed of graphic processing, and increases the speed of the graphics accelerator card by directly accessing the MEM-P 2212 with a high throughput.

The operation displaying unit 11 connected to the ASIC 2216 accepts an operation input from the operator, and transmits the accepted operation input information to the ASIC 2216.

Note that the image displaying program and the image forming program executed on the MFP according to the present embodiments are provided as being incorporated in a ROM or the like.

The image displaying program and the image forming program executed on the MFP according to the present embodiments may be configured to be provided as being recorded in an installable format or an executable format on a computer-readable recording medium, such as a Compact-Disk Read-Only Memory (CD-ROM), a flexible disk (FD), a Compact-Disk Readable (CD-R), or a Digital Versatile Disk (DVD).

Furthermore, the image displaying program and the image forming program executed on the MFP according to the present embodiments may be configured to be provided as being stored on a computer connected to a network, such as the Internet, and then being downloaded via the network. Also, the image displaying program and the image forming program executed on the MFP according to the present embodiments may be provided or distributed through a network, such as the Internet.

The image displaying program and the image forming program executed on the MFP according to the present embodiments has a module configuration including each of the components explained above (the analyzing unit 12, the editing unit 13, the associating unit 14, the display control unit 15, the communicating unit 16, the process storing unit 21, the attribute-icon generating unit 41, the note-information generating unit 42, the filter unit 51, the relating unit 61, the accommodation-area generating unit 71, and others). As actual hardware, with the CPU (processor) reading the image displaying program and the image forming program from the ROM for execution, each unit explained above is loaded onto a main storage device, thereby generating the analyzing unit 12, the editing unit 13, the associating unit 14, the display control unit 15, the communicating unit 16, the process storing unit 21, the attribute-icon generating unit 41, the note-information generating unit 42, the filter unit 51, the relating unit 61, the accommodation-area generating unit 71, and others on the main storage device.

The present embodiments and modified examples of the present invention set forth above are merely by way of example for explanation, and the present invention is not restricted these specific examples explained herein.

As described above, according to an embodiment of the present invention, for input document data, which one of attributes including a character, a photographic image, a half-tone image, a chart image, and others a document component has is analyzed. An editing process then performed on the input document data for each analyzed document component. A display is then produced on an operation displaying unit with two display modules, that is, an input display module in which each document component is displayed without being subjected to the editing process on the input document data and an editing display module in which each document component is displayed as being subjected to the editing process. An editing process is then performed on the document data based on an editing input accepted through a touch input from the display, and then the editing result is displayed. With this configuration, an effect can be achieved that a document editing apparatus with high operability and work efficiency can be provided, the apparatus capable of displaying an input document, performing an editing process through a touch input from the display, immediately displaying the process result, and then allowing visual recognition.

Furthermore, according to an embodiment of the present invention, the attribute is analyzed based on identification of an area in the document. The attribute is analyzed based on parsing. Also, an input for setting an attribute from any display module of the operation displaying unit and the attribute setting input is taken as the analysis result. With this configuration, the attribute of the document component in the input document data can be accurately analyzed. Therefore, an effect can be achieved that a document editing apparatus with high operability and work efficiency can be provided, the apparatus capable of performing an editing process through an accurate display, immediately displaying the process result, and allowing visual recognition.

Moreover, according to an embodiment of the present invention, the operation displaying unit displays an area occupied by each document component with an area defining representation, which is a representation that defines an area occupied by each analyzed document component. With this configuration, an effect can be achieved that a document editing apparatus with high operability and work efficiency can be provided, the apparatus capable of displaying the input document and allowing easy visual recognition of each document component divided into areas on the display.

Furthermore, according to an embodiment of the present invention, the operation displaying unit displays the area defining representation in a form so that the area defining representation defines an area of a document component and is layered on the area of the document component. With this configuration, an effect can be achieved that a document editing apparatus with high operability and work efficiency can be provided, the apparatus capable of allowing a display with easy and clear visual recognition of the area and its boundary.

Moreover, according to an embodiment of the present invention, the operation displaying unit displays the area defining representation in a different color according to the attribute of the document component. With this configuration, an effect can be achieved that a document editing apparatus with high operability and work efficiency can be provided, the apparatus capable of allowing a display with easy visual recognition at a glance of the attribute of the document component divided into areas.

Furthermore, according to an embodiment of the present invention, the operation displaying unit displays the area defining representation in a different color correspondingly to each attribute of the image including the character, the photographic image, the halftone image, a table, a line, and others as an attribute of the document component. With this configuration, different attributes are displayed in different colors. Therefore, an effect can be achieved that a document editing apparatus with high operability and work efficiency can be provided, the apparatus capable of allowing a display with easy visual recognition at a glance of the attribute of the document component.

Moreover, according to an embodiment of the present invention, the attribute is analyzed based on a layout analysis for analyzing a structure in the document component in the document and a character analysis for analyzing a character element to a machine-processable format. With this configuration, the document editing apparatus achieves high operability and work efficiency and is capable of accurately analyzing the attribute of the document component.

Furthermore, according to an embodiment of the present invention, the character analysis is performed through at least one of optical character reading, spline vector transformation of transforming a character to a spline vector, and character cutout by cutting out a character. With this configuration, the document editing apparatus achieves high operability and work efficiency and is capable of accurately analyzing the attribute of the document component.

Moreover, according to an embodiment of the present invention, the operation displaying unit accepts an input signal requesting for at least any one of a set of editing processes that includes add, move, and delete, for each of the document components displayed. When the editing process accepted by the operation displaying unit is performed, the operation displaying unit displays the document component subjected to the editing process. With this configuration, the document editing apparatus achieves high operability and work efficiency and is capable of accepting and performing any of the editing processes of add, move, and delete for each of the document components displayed.

Furthermore, according to an embodiment of the present invention, the operation displaying unit accepts a drag operation for performing at least any one of operations of move and copy for a document component displayed in the input display module, and produces a display with the document component being dragged to the editing display module. From the display of the document component dragged to the editing display module, the operation displaying unit can accepts an editing input. With this configuration, the document editing apparatus achieves high operability and work efficiency and is capable of performing an editing operation through a drag operation.

Moreover, according to an embodiment of the present invention, the operation displaying unit produces a display with a document component being inserted in the editing display module. With this configuration, the document editing apparatus achieves high operability and work efficiency and is capable of performing an editing operation of inserting a document component.

Furthermore, according to an embodiment of the present invention, an operation input for requesting for insertion of the document component displayed on the operation displaying unit is accepted, and a post-insertion display is produced according to the insertion request. With this configuration, the document editing apparatus achieves high operability and work efficiency and is capable of performing an inserting operation on the displayed document component and displaying a post-insertion state.

Moreover, according to an embodiment of the present invention, a process storing unit that stores information about a process to be performed on the document component displayed on the operation displaying unit is provided. When the operation displaying unit accepts an input requesting execution of undo or redo, an undo or redo process is performed based on the information about the process stored in the process storing unit. With this configuration, the document editing apparatus achieves high operability and work efficiency and is capable of accepting and performing an undo or redo operation from a display surface and displaying the result.

Furthermore, according to an embodiment of the present invention, a document component with a character attribute to be displayed is displayed as a document component of a character image with an image attribute. With this configuration, in the case of a character attribute with a low character recognition rate, switching can be made to a display of the read image as it is. Therefore, an effect can be achieved that a document editing apparatus with high operability and work efficiency can be provided, the apparatus capable of a more accurate display.

Moreover, according to an embodiment of the present invention, an attribute displaying unit is provided capable of displaying the attribute of the document component to be analyzed irrespectively of the type, language, and writing direction of characters. With this configuration, the document editing apparatus achieves high operability and work efficiency and is capable of producing a display representing the attribute of the document component and allowing visual recognition.

Furthermore, according to an embodiment of the present invention, an attribute icon is displayed, which is an icon displayed in association with an area of the document component to be display and indicating attribute information of the document component displayed when the icon is clicked. With this configuration, the document editing apparatus achieves high operability and work efficiency and is capable of allowing visual recognition of the attribute of the document component by clicking the icon.

Moreover, according to an embodiment of the present invention, a display is produced on the operation displaying unit with an addition of a graphical note containing various explanations. With this configuration, the document editing apparatus achieves high operability and work efficiency and is capable of allowing graphical visual recognition of various explanations and notes on the operation displaying unit.

Furthermore, according to an embodiment of the present invention, the graphical note is displayed through a draw operation using a pointing device displayed on the operation displaying unit. With this configuration, the document editing apparatus achieves high operability and work efficiency and is capable of displaying a graphical note at the time of a draw operation using a pointing device.

Moreover, according to an embodiment of the present invention, the pointing device to be displayed on the operation displaying unit and used in the draw operation uses a plurality of colors. With this configuration, the document editing apparatus achieves high operability and work efficiency and is capable of allowing visual recognition of a different type of pointing device by a different color.

Furthermore, according to an embodiment of the present invention, a filter unit that performs a filter process on the input document data. The filter unit performs a filter process on the document component according to the analyzed attribute. With this configuration, the document editing apparatus achieves high operability and work efficiency and is capable of performing a filter process according to the attribute of the document component.

Moreover, according to an embodiment of the present invention, the filter unit includes at least one of a ground clarifying filter that clarifies a ground of the document component in a non-halftone image, a character resolution filter that improves a character resolution, a color correction filter that performs a color correction process, a noise filter that cuts off noise, a correction filter that corrects a geometric distortion correction, and a visibility filter that changes visibility. With this configuration, the document editing apparatus achieves high operability and work efficiency and is capable of performing ground clarification, resolution improvement, color correction, noise cut-off, distortion correction, and change in visibility through a filter process.

Furthermore, according to an embodiment of the present invention, a linking display is produced with an association of document components by linking based on the attribute. With this configuration, the document editing apparatus achieves high operability and work efficiency and is capable e of allowing visual recognition of linking between document components.

Moreover, according to an embodiment of the present invention, the operation displaying unit displays the linking display with arrows between document components. With this configuration, the document editing apparatus achieves high operability and work efficiency and is capable of allowing visual recognition of linking between document components.

Furthermore, according to an embodiment of the present invention, the analyzed document components are associated based on the attributes of the document components, and this association is displayed. With this configuration, the document editing apparatus achieves high operability and work efficiency and is capable of displaying the association based on the attributes and allowing visual recognition.

Moreover, according to an embodiment of the present invention, an association based on the attributes of the document components is performed in the order of description, and a display is produced with an order representation in that order. With this configuration, the document editing apparatus achieves high operability and work efficiency and is capable of displaying a document order relation and allowing visual recognition.

Furthermore, according to an embodiment of the present invention, an accommodation area representation occupying a predetermined area for display in a form of an area accommodating a document component is displayed. For a document component to be displayed, a drag operation for performing at least either one of operations of move and copy is accepted, and a display is produced with the document component being accommodated in the accommodation area representation. Then, the document data is edited with the document component being accommodated in the accommodation area representation. With this configuration, the document editing apparatus achieves high operability and work efficiency and is capable of dragging a document component desired to be dragged and embedded to a position occupying the predetermined area.

Moreover, according to an embodiment of the present invention, when performing insertion of the document component in the accommodation area representation, the display size is changed so that the document component can fit in the accommodation area representation. With this configuration, the document editing apparatus achieves high operability and work efficiency and is capable of performing a drag operation without requiring the operator to be aware of whether the document component can fit in a predetermined accommodation area representation.

Furthermore, according to an embodiment of the present invention, when performing insertion of the document component in the accommodation area representation, the display size is changed through a compression or decompression process of an image data size when the document component to be inserted is an image, and through a process of deforming a character size when the document component to be inserted is formed of characters. With this configuration, the document editing apparatus achieves high operability and work efficiency and is capable of performing a drag operation without requiring the operator to be aware of whether the document component can fit in a predetermined accommodation area representation.

Moreover, according to an embodiment of the present invention, a request for linking a document component with characters and a plurality of accommodation area representations displayed on the operation displaying unit. The operation displaying unit inserts the same document component with characters in the accommodation area representations linked to the same document component with characters. With this configuration, the document editing apparatus achieves high operability and work efficiency and is capable of dragging the same document component with characters to a plurality of places.

Furthermore, according to an embodiment of the present invention, a document component with characters is inserted, as being divided, in a plurality of accommodation area representations linked to the document component with characters. With this configuration, the document editing apparatus achieves high operability and work efficiency and is capable of dragging a predetermined document component with characters to a plurality of places as being divided.

Moreover, according to an embodiment of the present invention, insertion of the document component in the accommodation area representation is performed upon a request input via a displayed user interface. With this configuration, the document editing apparatus achieves high operability and work efficiency and is capable of inserting the document component in the accommodation area representation via the displayed user interface.

Furthermore, according to an embodiment of the present invention, upon a request for inserting the document component in the accommodation area representation, an insertion process is performed based on an analysis of the attribute of the document component to be analyzed, and a post-insertion display is produced. With this configuration, the document editing apparatus achieves high operability and work efficiency and is capable of insertion in the accommodation area representation with an inserting process according to the attribute.

Moreover, according to an embodiment of the present invention, at least any one of processes of move, size change, copy, and delete of an accommodation area representation displayed on the operation displaying unit is performed through an input via a displayed pointing device. With this configuration, the document editing apparatus achieves high operability and work efficiency and is capable of performing any of processes of move, size change, copy, and delete of an accommodation area representation through an input from a display of the pointing device.

Furthermore, according to an embodiment of the present invention, an image forming apparatus is provided in which document data is input by an input unit, the input document data is subjected to an editing process by a document editing apparatus, and the edited document data is output by an output unit, the document editing apparatus analyzes, for input document data, which one of attributes including a character, a photographic image, a halftone image, a chart image, and others a document component has; performs an editing process on the input document data for each analyzed document component; produces a display on an operation displaying unit with two display modules, that is, an input display module in which each document component is displayed without being subjected to the editing process on the input document data and an editing display module in which each document component is displayed as being subjected to the editing process; performs an editing process on the document data based on an editing input accepted through a touch input from the display; and then displays the editing result. With this configuration, the document editing apparatus achieves high operability and work efficiency and is capable of displaying an input document, performing an editing process through a touch input from the display, immediately displaying the process result, allowing visual recognition, and then performing an output process.

Moreover, according to an embodiment of the present invention, an effect can be achieved providing a program that can cause a computer to perform the document editing method described above.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image editing apparatus comprising:
   an input unit to input an image data;
   an area identifying unit to separate input the image data into each image area corresponding to attributes;
   a processing unit to process each image area corresponding to the attribute associated with each image area;
   an editing unit to perform an editing process on the image data in units for each image area;
   a first operation displaying unit to display a first screen that displays the image data, the first screen to receive a selection of an image area while not accepting edits to the image data, and a second screen that displays edited image data edited in the image area units in a data format corresponding to the attribute of the image area by the editing unit;
   a receiving unit to receive a change of setting of the attribute corresponding to the image area which is displayed in the second screen; and
   a second operation displaying unit to display the image area processed corresponding to the attribute of the image data by the processing unit in response to the change of setting of the attribute of the image area.

2. The image editing apparatus according to claim 1, wherein
   the operation displaying unit accepts an input signal requesting at least one of editing processes of add, move, and delete, for each of the separated image areas to be displayed,
   the editing unit performs accepted editing processes, and
   the operation displaying unit further displays each of the image areas on which the editing process is performed.

3. The image editing apparatus according to claim 1, wherein
   the operation displaying unit accepts a drag operation for performing at least one of operations of move and copy for each of the image areas displayed in the input display module, produces a display with the image area being dragged to the editing display module, and accepts an editing input from a display of each of the image areas dragged to the editing display module.

4. The image editing apparatus according to claim 1, wherein
   the operation displaying unit produces a display with each of the image areas being inserted in the editing display module.

5. The image editing apparatus according to claim 1, wherein
   the operation displaying unit accepts an operation input requesting for insertion of each of the image areas displayed on the operation displaying unit, and produces a post-insertion display according to the insertion request.

6. The image editing apparatus according to claim 1, wherein
   the operation displaying unit displays each of the image areas having a character attribute to be displayed by the operation displaying unit as an image area of a character image having an image attribute.

7. The image editing apparatus according to claim 1, further comprising:
   a relating unit to link the separated image areas based on attributes of the image areas, wherein
   the operation displaying unit displays a linking status performed by the relating unit.

8. The image editing apparatus according to claim 7, wherein
   the operation displaying unit displays the linking status of each of the image areas with an arrow.

9. The image editing apparatus according to claim 1, wherein
   the operation displaying unit displays an accommodation area representation occupying a predetermined area for display in a form of an area accommodating each of the image areas in the display, accepts a drag operation for performing at least one of operations to move and copy each of the image areas to the accommodation area representation, and further displays each of the image areas in a state of being accommodated in the accommodation area representation, and the editing unit edits the image data with each of the image areas being accommodated in the accommodation area representation.

10. The image editing apparatus according to claim 9, wherein
the operation displaying unit accepts a request for linking an image area with characters and a plurality of the accommodation area representations displayed by the operation displaying unit, and produces a display by inserting the same image area with characters in the accommodation area representations linked to the image area with characters.

11. The image editing apparatus according to claim 1, further comprising:
the receiving unit to receive a change of setting for the image area from a document attribute to an image attribute or from the image attribute to the document attribute; and
the processing unit to process the image area based on the change of setting.

12. An image editing method comprising:
inputting an image data;
separating the image data into each image area;
determining an attribute associated with each image area;
processing each image area corresponding to the attribute associated with each image area;
editing the image data in units for each image area; and
operating displaying including
   displaying the image data in a first screen that displays the image data, the first screen receiving a selection of an image area while not accepting edits to the image data, and
   displaying edited image data in a second screen that displays the edited image data in the image area units in a data format corresponding to the attribute of the image area;
and
in response to receiving a request to change a setting of an attribute of an image area, displaying the image area in the second screen, the image area displayed in the second screen processed based on the change to the setting of the attribute.

13. The image editing method according to claim 12, wherein
the operation displaying includes accepting an input signal requesting for at least one of editing processes that include add, move, and delete, for each of the separated image areas to be displayed,
the editing includes performing accepted editing processes, and
the operation displaying further includes displaying each of the image areas on which the editing process is performed.

14. The image editing method according to claim 12, wherein
the operation displaying includes displaying each of the image areas that have a character attribute to be displayed, as an image area of a character image having an image attribute.

15. The image editing method according to claim 12, further comprising:
linking the separated image areas based on attributes of the image areas, wherein the operation displaying includes displaying a linking status performed at the linking.

16. A computer program product comprising a computer-readable non-transitory medium having computer readable program codes embodied in the medium that when executed cause a computer to execute:
inputting an image data;
separating the image data into each image area;
determining an attribute associated with each image area;
processing each image area corresponding to the attribute associated with each image area;
editing the image data in units for each image area; and
operating displaying including
   displaying the image data in a first screen that displays the image data, the first screen receiving a selection of an image area while not accepting edits to the image data, and
   displaying edited image data in a second screen that displays the edited image data in the image area units in a data format corresponding to the attribute of the image area;
and
in response to receiving a request to change a setting of an attribute of an image area, displaying the image area in the second screen, the image area displayed in the second screen processed based on the change to the setting of the attribute.

17. The computer program product according to claim 16, wherein
the operation displaying includes accepting an input signal requesting for at least one of editing processes that include add, move, and delete, for each of the separated image areas to be displayed,
the editing includes performing accepted editing processes, and
the operation displaying further includes displaying each of the image areas on which the editing process is performed.

18. The computer program product according to claim 16, wherein
the operation displaying includes displaying each of the image areas that have a character attribute to be displayed, as an image area of a character image having an image attribute.

19. The computer program product according to claim 16, further comprising:
linking the separated image areas based on attributes of the image areas, and the operation displaying includes displaying a linking status performed at the linking.

* * * * *